US010004004B2

(12) United States Patent
Mufti

(10) Patent No.: US 10,004,004 B2
(45) Date of Patent: Jun. 19, 2018

(54) TELECOMMUNICATION EQUIPMENT MEASURING PRE-ESTABLISHMENT SERVICE INTERRUPTIONS

(71) Applicant: T-Mobile USA, Inc., Bellevue, WA (US)

(72) Inventor: Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days. days.

(21) Appl. No.: 14/552,945

(22) Filed: Nov. 25, 2014

(65) Prior Publication Data

US 2016/0021580 A1  Jan. 21, 2016

Related U.S. Application Data

(60) Provisional application No. 62/024,884, filed on Jul. 15, 2014.

(51) Int. Cl.
*H04W 4/00* (2018.01)
*H04W 28/02* (2009.01)
(Continued)

(52) U.S. Cl.
CPC ....... *H04W 36/0022* (2013.01); *H04W 36/08* (2013.01); *H04W 36/30* (2013.01);
(Continued)

(58) Field of Classification Search
CPC . H04W 36/0022; H04W 36/08; H04W 36/30; H04W 40/14; H04W 40/36;
(Continued)

(56) References Cited

U.S. PATENT DOCUMENTS

| 7,257,374 B1 * | 8/2007 | Creigh ............... H04M 1/67 455/41.2 |
| 8,655,357 B1 | 2/2014 | Gazzard et al. |

(Continued)

FOREIGN PATENT DOCUMENTS

| CN | 103561432 | 2/2014 |
| EP | 2667659 | 11/2013 |

(Continued)

OTHER PUBLICATIONS

"3GPP TS 24.229 V10.9.0", 3rd Generation Partnership Project; Technical Specification Group Core Network and Terminals; IP multimedia call control protocol based on Session Initiation Protocol (SIP) and Session Description Protocol (SDP); Stage 3 (Release 10), retrieved at <http://www.3gpp.org/DynaReport/24229.htm>, Jun. 27, 2014, pp. 1-24, 58-59, 96-109, 145-151, and 216-218.

(Continued)

*Primary Examiner* — Edan Orgad
*Assistant Examiner* — Vanneilian Lalchinthang
(74) *Attorney, Agent, or Firm* — Lee & Hayes, PLLC; Robert C. Peck; Christopher J. White

(57) ABSTRACT

User equipment communicating with a telecommunications network may be configured to selectively initiate a communication session with another device via a first access network of a first type. During a pre-establishment phase, the user equipment may measure the first access network to provide a first measurement. In response to the first measurement corresponding to a first service-interruption condition, the user equipment may cancel the communication session, tune a radio of the user equipment to communicate with a second access network of a second, different type, and re-initiate the communication session with the other device via the second access network. The user equipment may, after the canceling, receive a retry invitation to the commu- (Continued)

nication session via the second access network, tune the radio thereto, and re-initiate the communication session with the other device via the second access network.

20 Claims, 15 Drawing Sheets

(51) Int. Cl.
  *H04W 36/00* (2009.01)
  *H04W 36/08* (2009.01)
  *H04W 36/30* (2009.01)
  *H04W 40/14* (2009.01)
  *H04W 40/36* (2009.01)

(52) U.S. Cl.
  CPC ........... *H04W 40/14* (2013.01); *H04W 40/36* (2013.01); *H04W 76/18* (2018.02); *H04W 76/22* (2018.02)

(58) Field of Classification Search
  CPC ... H04W 76/027; H04W 76/18; H04W 76/22; H04L 65/1016; H04L 65/1083
  USPC .......................................................... 370/221
  See application file for complete search history.

(56) References Cited

U.S. PATENT DOCUMENTS

| | | | |
|---|---|---|---|
| 8,718,636 B1 | 5/2014 | Pankajakshan | |
| 8,879,503 B2 | 11/2014 | Dwyer et al. | |
| 8,995,959 B2* | 3/2015 | Cakulev | H04W 12/06 455/411 |
| 2004/0199641 A1 | 10/2004 | Bajko | |
| 2004/0199649 A1 | 10/2004 | Tarnanen et al. | |
| 2005/0071679 A1 | 3/2005 | Kiss et al. | |
| 2006/0084438 A1 | 4/2006 | Kwon | |
| 2006/0239229 A1 | 10/2006 | Marinescu et al. | |
| 2008/0039085 A1 | 2/2008 | Phan-Anh | |
| 2008/0089272 A1 | 4/2008 | Ahokangas | |
| 2008/0091814 A1 | 4/2008 | Xie | |
| 2008/0126535 A1 | 5/2008 | Zhu et al. | |
| 2008/0299927 A1* | 12/2008 | Tenbrook | H04W 48/16 455/226.2 |
| 2009/0017824 A1 | 1/2009 | Lee et al. | |
| 2009/0068996 A1 | 3/2009 | Bakker et al. | |
| 2009/0296566 A1 | 12/2009 | Yasrebl et al. | |
| 2009/0296567 A1 | 12/2009 | Yasrebi et al. | |
| 2010/0054209 A1 | 3/2010 | Mahdi | |
| 2010/0223492 A1 | 9/2010 | Farrugia et al. | |
| 2010/0311386 A1 | 12/2010 | Edge et al. | |
| 2010/0329243 A1 | 12/2010 | Buckley et al. | |
| 2010/0329244 A1 | 12/2010 | Buckley et al. | |
| 2011/0013597 A1* | 1/2011 | Hwang | H04W 8/12 370/331 |
| 2011/0040836 A1 | 2/2011 | Allen et al. | |
| 2011/0040882 A1 | 2/2011 | Delos Reyes et al. | |
| 2011/0058520 A1* | 3/2011 | Keller | H04W 76/021 370/328 |
| 2011/0230192 A1* | 9/2011 | Tiwari | H04W 36/0022 455/436 |
| 2011/0296034 A1* | 12/2011 | Mayer | H04M 7/128 709/227 |
| 2012/0039303 A1 | 2/2012 | Stenfelt et al. | |
| 2012/0063420 A1 | 3/2012 | Long et al. | |
| 2012/0069731 A1 | 3/2012 | Tooher et al. | |
| 2012/0083240 A1 | 4/2012 | Patel | |
| 2012/0172042 A1 | 7/2012 | Drevon et al. | |
| 2012/0236709 A1 | 9/2012 | Ramachandran et al. | |
| 2012/0258712 A1 | 10/2012 | Rozinov | |
| 2012/0295617 A1 | 11/2012 | Anchan et al. | |
| 2013/0021998 A1 | 1/2013 | Shatsky | |
| 2013/0023265 A1 | 1/2013 | Swaminathan et al. | |
| 2013/0024574 A1 | 1/2013 | Lau et al. | |
| 2013/0029629 A1 | 1/2013 | Lindholm et al. | |
| 2013/0051362 A1 | 2/2013 | Lee et al. | |
| 2013/0143565 A1 | 6/2013 | Zisimopoulos et al. | |
| 2013/0151586 A1 | 6/2013 | Morishige et al. | |
| 2013/0174254 A1 | 7/2013 | Gould et al. | |
| 2013/0183965 A1 | 7/2013 | Ramachandran et al. | |
| 2013/0195076 A1 | 8/2013 | Keller et al. | |
| 2013/0329567 A1 | 12/2013 | Mathias et al. | |
| 2014/0051443 A1 | 2/2014 | Diachina et al. | |
| 2014/0064156 A1* | 3/2014 | Paladugu | H04W 28/0268 370/259 |
| 2014/0143393 A1 | 5/2014 | Martinez Perea et al. | |
| 2014/0176660 A1* | 6/2014 | Khay-Ibbat | H04W 36/30 348/14.02 |
| 2014/0219241 A1* | 8/2014 | Parron | H04W 36/0022 370/331 |
| 2014/0370842 A1* | 12/2014 | Abtin | H04L 65/1069 455/404.2 |
| 2014/0378105 A1 | 12/2014 | Suryavanshi | |
| 2015/0003342 A1 | 1/2015 | Swaminathan et al. | |
| 2015/0016420 A1 | 1/2015 | Balabhadruni et al. | |
| 2015/0024751 A1* | 1/2015 | Wong | H04W 36/0022 455/436 |
| 2015/0382251 A1 | 12/2015 | Wang et al. | |
| 2016/0021579 A1 | 1/2016 | Mufti | |
| 2016/0029228 A1 | 1/2016 | Mufti | |
| 2016/0037390 A1 | 2/2016 | Mufti et al. | |
| 2016/0037471 A1 | 2/2016 | Mufti | |
| 2016/0149965 A1 | 5/2016 | Kubik et al. | |
| 2016/0150497 A1 | 5/2016 | Janosi et al. | |
| 2016/0234744 A1 | 8/2016 | Wu et al. | |
| 2016/0249401 A1 | 8/2016 | Tanaka et al. | |
| 2016/0286516 A1 | 9/2016 | Wu | |

FOREIGN PATENT DOCUMENTS

| | | |
|---|---|---|
| KR | 1020090065320 | 6/2009 |
| KR | 1020100102363 | 9/2010 |
| WO | 2007047477 | 4/2007 |
| WO | 2012062379 | 5/2012 |
| WO | 2013075746 | 5/2013 |
| WO | 2013104651 | 7/2013 |
| WO | 2013114158 | 8/2013 |
| WO | 2013156061 | 10/2013 |
| WO | WO2014101500 | 7/2014 |
| WO | WO2014124658 | 8/2014 |
| WO | WO2014183668 A1 | 11/2014 |

OTHER PUBLICATIONS

PCT Search Report and Written Opinion dated Oct. 13, 2015 for PCT Application No. PCT/US15/38634, 11 pages.
PCT Search Report and Written Opinion dated Oct. 15, 2015 for PCT Application No. PCT/US15/38652, 14 pages.
PCT Search Report and Written Opinion dated Oct. 19, 2015 for PCT Application No. PCT/US15/39414, 12 pages.
PCT Search Report and Written Opinion dated Nov. 11, 2015 for PCT Application No. PCT/US15/43467, 12 pages.
PCT Search Report and Written Opinion dated Nov. 27, 2015 for PCT Application No. PCT/US15/43454, 10 pages.
Office action for U.S. Appl. No. 14/552,871, dated Feb. 10, 2017, Mufti, "Telecommunication Network Pre-Establishment Service Interruption Response", 23 pages.
Office action for U.S. Appl. No. 14/568,633, dated Apr. 12, 2017, Mufti, "Suppressing Third Party Registration and Third Party Deregistration Actions", 16 pages.
Office Action for U.S. Appl. No. 14/552,871, dated May 25, 2017, Mufti, "Telecommunication Network Pre-Establishment Service Interruption Response", 27 pages.
Office Action for U.S. Appl. No. 14/689,318, dated Jun. 1, 2017, Mufti, "Telecommunications Network Non-Establishment Response", 18 pages.
"Digital cellular telecommunications system (Phase 2+); Universal Mobile Telecommunications System (UMTS); LTE; Mobile radio interface signalling layer 3;" General Aspects. 3GPP TS 24.007 V9.0.0. Oct. 2010. pp. 13, 15-17, 106-107.

(56) References Cited

OTHER PUBLICATIONS

Office action for U.S. Appl. No. 14/815,831, dated May 19, 2016, Mufti et al., "Telecommunications Network Emergency-Call Handover", 15 pages.
Office action for U.S. Appl. No. 14/689,318, dated Oct. 41, 2016, Mufti, "Telecommunications Network Non-Establishment Response", 18 pages.
Office action for U.S. Appl. No. 14/552,871, dated Oct. 6, 2016, Mufti, "Telecommunication Network Pre-Establishment Service Interruption Response", 23 pages.
Office action for U.S. Appl. No. 14/815,831, dated Dec. 2, 2016, Mufti et al., "Telecommunications Network Emergency-Call Handover", 13 pages.
DoCoMo, et al., "Handover Cancellation Timing", 3GPP Draft; 3rd Generation Partnership Project, Mobile Competence Centre, France, vol. RAN WG3, No. Kansas City, USA; Apr. 30, 2008.
The Extended European Search Report dated Dec. 15, 2017 for European patent application No. 15822829.6, 16 pages.
The Chinese Office Action dated Dec. 8, 2017 for Chinese patent application No. 201580051477.5, a counterpart foreign application of U.S. Pat. No. 9,699,211.
Office action for U.S. Appl. No. 14/552,871, dated Jan. 11, 2018, Mufti, "Telecommunication Network Pre-Establishment Service Interruption Response", 19 pages.
The Extended Euroepan Search Report dated Jan. 30, 2018 for European patent application No. 15829069.2, 15 pages.
Lucent Technologies, "Filter criteria matching and generation of third-Party Register request for network-initiated derigstration", 3GPP Draft; N1-050222, 3rd Generation Partnership Project (3GPP), Mobile Competence, France, vol. TSG CN, No. Sydney, Australia; Mar. 2, 2005, retrieved on Mar. 2, 2005.

Nokia, "Third party registration optimisation", 3GPP Draft; N1-041441_3RDPARTYREGOPT-A, 3rd Generation Partnership Project (3GPP), France, vol. CN WG1, No. Sophia Antipolis, France, Aug. 10, 2004. retrieved on Aug. 10, 2004.
The Extended Euroepan Search Report dated Feb. 13, 2018 for European patent application No. 15824514.2, 12 pages.
The Extended Euroepan Search Report dated Feb. 19, 2018 for European patent application No. 15830023.6, 12 pages.
Nokia Siemens Networks et al: "Multiple EATF addressing",3GPP Draft; S2-113311, vol. SA WG2, No. Naantali; 20110711, Jul. 5, 2011, XP050548597, 2 pages.
The Extended European Search Report dated Sep. 27, 2017 for European Patent Application No. 15821476.7, 16 pages.
Ericsson, "Clarification of conditions for transfer of calls in an early phase", retrieved on Mar. 3, 2014 at «http://www.3gpp.org/ftp/Meetings_3GPP_SYNC/CT/CT/Docs/», 3GPP Draft, 3rd Generation Partnership Project, Mobile Competence Centre, France, vol. CT WG1, No. Guangzhou 20140120-20140124, 2014, 9 pages.
Nsn, et al., "Correct request for PS to CS cancelled handling", retrieved on Mar. 3, 2014 at «http://www.3gpp.org/ftp/Meetings_3GPP_SYNC/CT/CT/Docs/», 3GPP Draft, 3rd Generation Partnership Project, Mobile Competence Centre, France, vol. CT WG1, No. Guangzhou 20140120-20140124, 2014, 3 pages.
Office action for U.S. Appl. No. 14/568,633, dated Oct. 19, 2017, Mufti, "Suppressing Third Party Registration and Third Party Deregistration Actions", 17 pages.
Office action for U.S. Appl. No. 14/689,318, dated Oct. 19, 2017, Mufti, "Telecommunications Network Non-Establishment Response", 25 pages.
Office Action for U.S. Appl. No. 14/552,871, dated Sep. 21, 2017, Mufti, "Telecommunication Network Pre-Establishment Service Interruption Response" 28 pages.

* cited by examiner

TELECOMMUNICATION EQUIPMENT MEASURING PRE-ESTABLISHMENT SERVICE INTERRUPTIONS

CROSS-REFERENCE TO RELATED APPLICATION

This application is a nonprovisional application of, and claims priority to and the benefit of, U.S. Patent Application Ser. No. 62/024,884, filed Jul. 15, 2014 and entitled "VoIte Handover Solutions for Pre-Alerting/Alerting Stage," the entirety of which is incorporated herein by reference.

BACKGROUND

Use of packet-switched connections for transmitting synchronous communications, such as voice calls, and data across telecommunication networks is increasing. Such packet-switched connections allow for greater speed and throughput than do circuit-switched connections, and also make packet-switched data from other networks, such as the Internet, more readily available. Most telecommunication networks, however, still utilize access networks that provide circuit-switched connections, such as Global System for Mobile Communications (GSM) networks or Universal Mobile Telecommunications System (UMTS) networks, due to the substantial infrastructure investment needed to expand packet-switched access networks. Such circuit-switched access networks may provide comparable or, at times, better speed and quality than packet-switched access networks for some types of data, including synchronous communications such as full-duplex voice communications.

Because packet-switched access networks are not available to the same extent as circuit-switched access networks, techniques have been developed for switching from one of type of packet-switched access network—e.g., the Long Term Evolution (LTE) access network—to circuit-switched access networks while maintaining continuity for a communication session, such as a voice call. One technique for handover of a communication session from a LTE access network to a circuit-switched access network involves the use of the single radio voice call continuity (SRVCC) standard produced by the Third Generation Partnership Project (3GPP). With SRVCC, an eNodeB of a LTE access network determines that a communication session handover should occur based on a measurement report received from user equipment. The eNodeB communicates this to a mobility management entity (MME), which makes a handover request of a mobile switching center (MSC) server of a circuit-switched access network that is available to the user equipment. The MSC server (MSS) then prepares the circuit-switched access network for the handover, and communicates with an Internet Protocol (IP) multimedia subsystem (IMS) of the telecommunication network, the IMS maintaining continuity for the communication session during the handover. The MSS then sends a handover response to the MME, and the MME instructs the user equipment to connect to the circuit-switched access network to continue the communication session.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, user equipment configured to initiate a communication session with another device via a first access network of a first type, wherein a pre-establishment phase follows or commences with the initiation of the communication session and precedes establishment of the communication session; during the pre-establishment phase, selectively measure the first access network to provide a first measurement; and, in response to the first measurement corresponding to a first service-interruption condition, selectively cancel the communication session, tune the radio to communicate with a second access network of a second, different type, and re-initiate the communication session with the other device via the second access network. The user equipment may be a cellular telephone, such as a feature phone or smartphone. In some examples, the user equipment may, during a pre-establishment phase of a communication session with another device, selectively transmit a session-status signal via a first access network of a first type; during the pre-establishment phase, selectively measure the first access network to provide a first measurement; and, in response to the first measurement corresponding to a first service-interruption condition, selectively cancel the communication session after transmission of the session-status signal. The telecommunication network device may initiate the handover responsive to measurement reports received from the user equipment.

Figure 1:
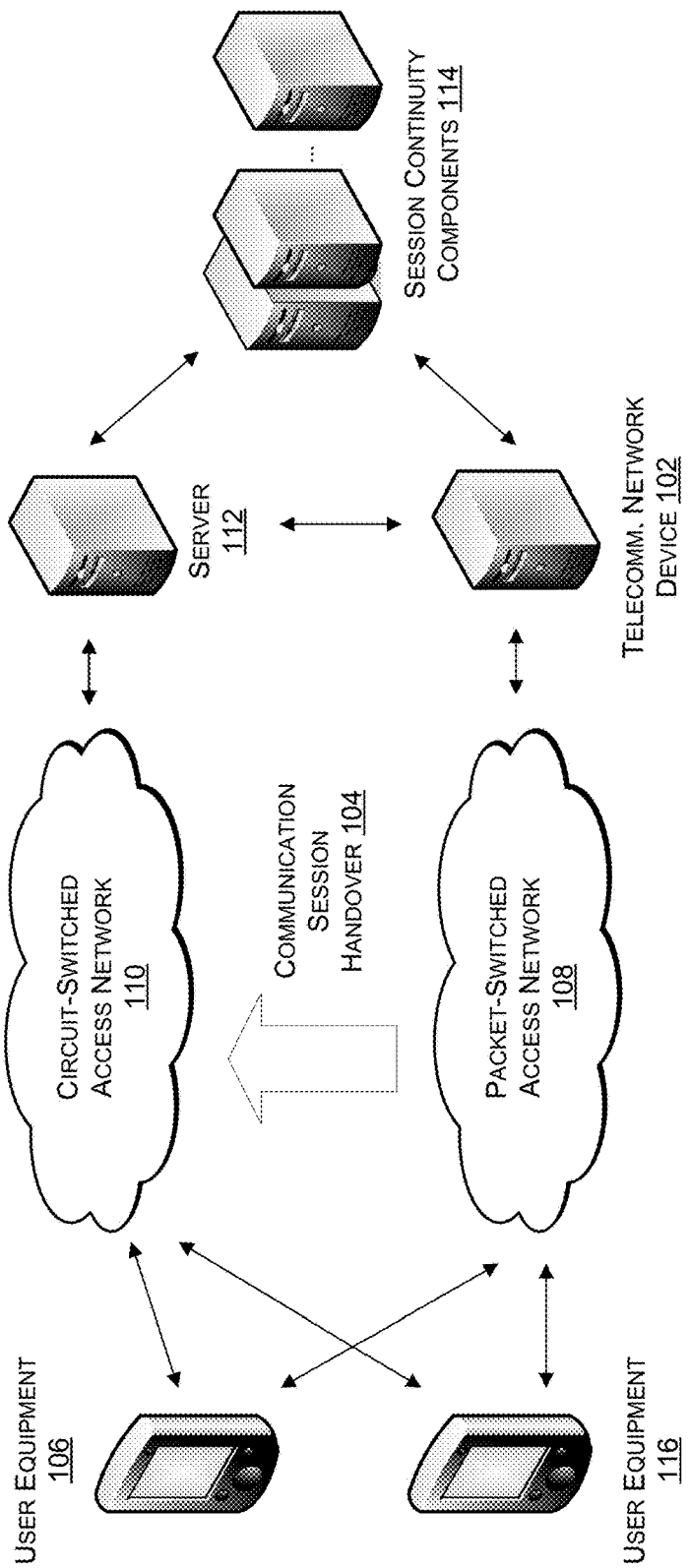
FIG. 1 illustrates an overview of devices involved in a handover of a communication session of user equipment from a packet-switched access network to a circuit-switched access network.

FIG. 1 illustrates an overview of devices involved in a handover of a communication session of user equipment from a packet-switched access network to a circuit-switched access network. As shown in FIG. 1, a telecommunication network device 102 may initiate a handover 104 of a communication session of user equipment 106 from a packet-switched access network 108 to a circuit-switched access network 110. As part of the handover 104, the telecommunication network device 102 (e.g., an MME) may provide a handover request to a server 112 (e.g., an MSS) that is associated with the circuit-switched access network 110. The server 112 may then prepare the circuit-switched access network 110 for the handover 104 and communicate with one or more session continuity components 114 to ensure continuity of the communication session during the handover 104. The server 112 then responds to the telecommunication network device 102, and the telecommunication network device 102 instructs the user equipment 106 to connect to the circuit-switched access network 110 to continue the communication session.

Throughout this disclosure, handover 104 is described in the example of a handover from packet-switched access network 108 to circuit-switched access network 110. However, handover 104 is not limited to that example. Handover 104 in various examples can be a handover from circuit-switched access network 110 to packet-switched access network 108, or in general between a first access network of a first type and a second access network of a second, different type.

Figure 3:
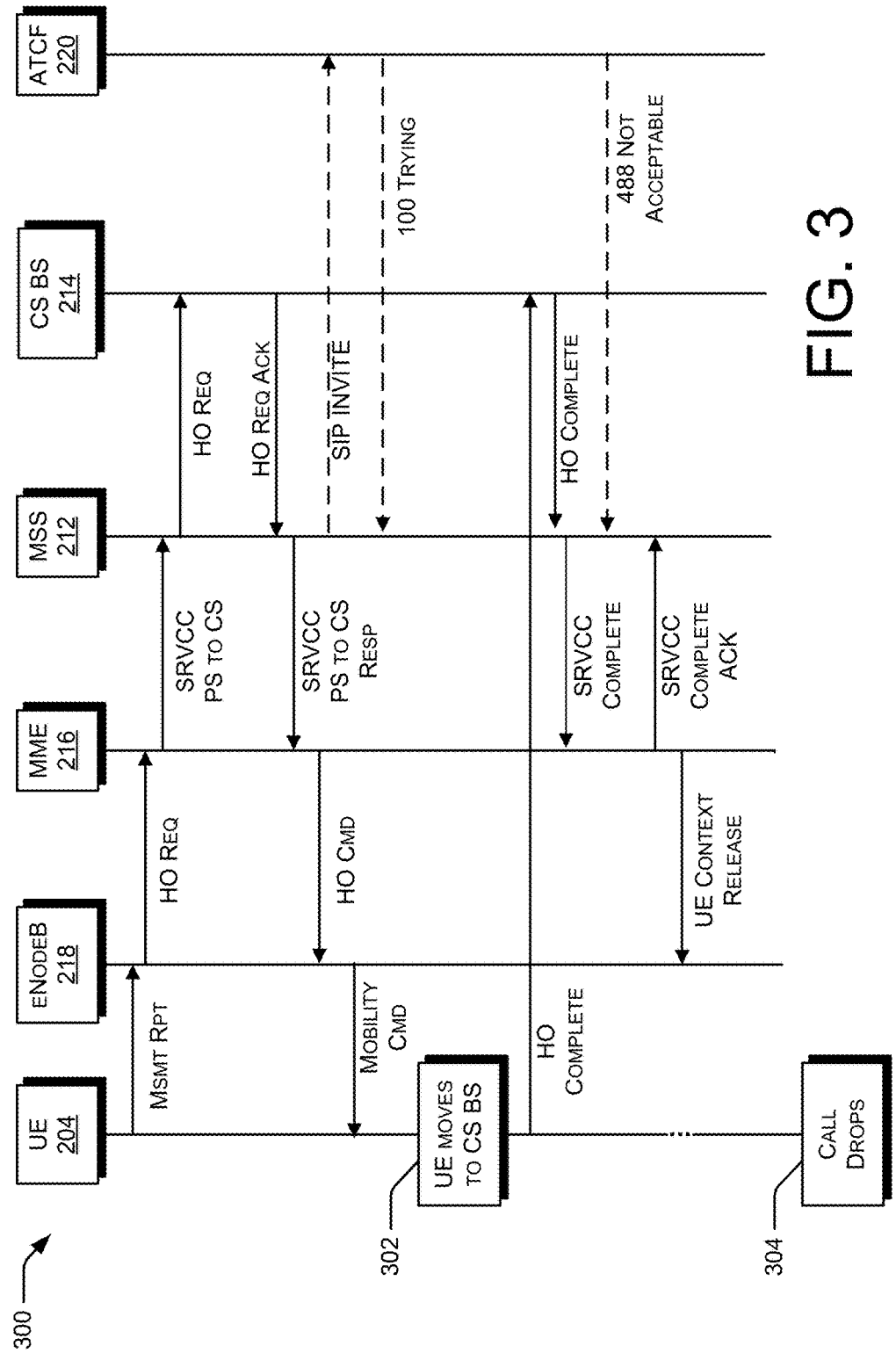
FIG. 3 shows an example call flow illustrating an example handoff failure.

The user equipment 106 may be any sort of device capable of cellular or wireless network communication, such as a cellular phone, a tablet computer, a personal digital assistant (PDA), a personal computer (PC), a laptop computer, a media center, a work station, etc. An example user equipment 106 is illustrated in FIG. 3 and described below with reference to that figure.

In some embodiments, the user equipment 106 may have a radio and be configured to tune that radio to licensed wireless spectrum utilized by circuit-switched access networks and packet-switched access networks, such as LTE access networks. The user equipment 106 may also be configured to tune the radio to wireless spectrum utilized by packet-switched access networks, such as GSM access networks or UMTS access networks. When equipped with a single radio, the user equipment 106 may only be connected to one of these access networks at a time.

Figure 2:
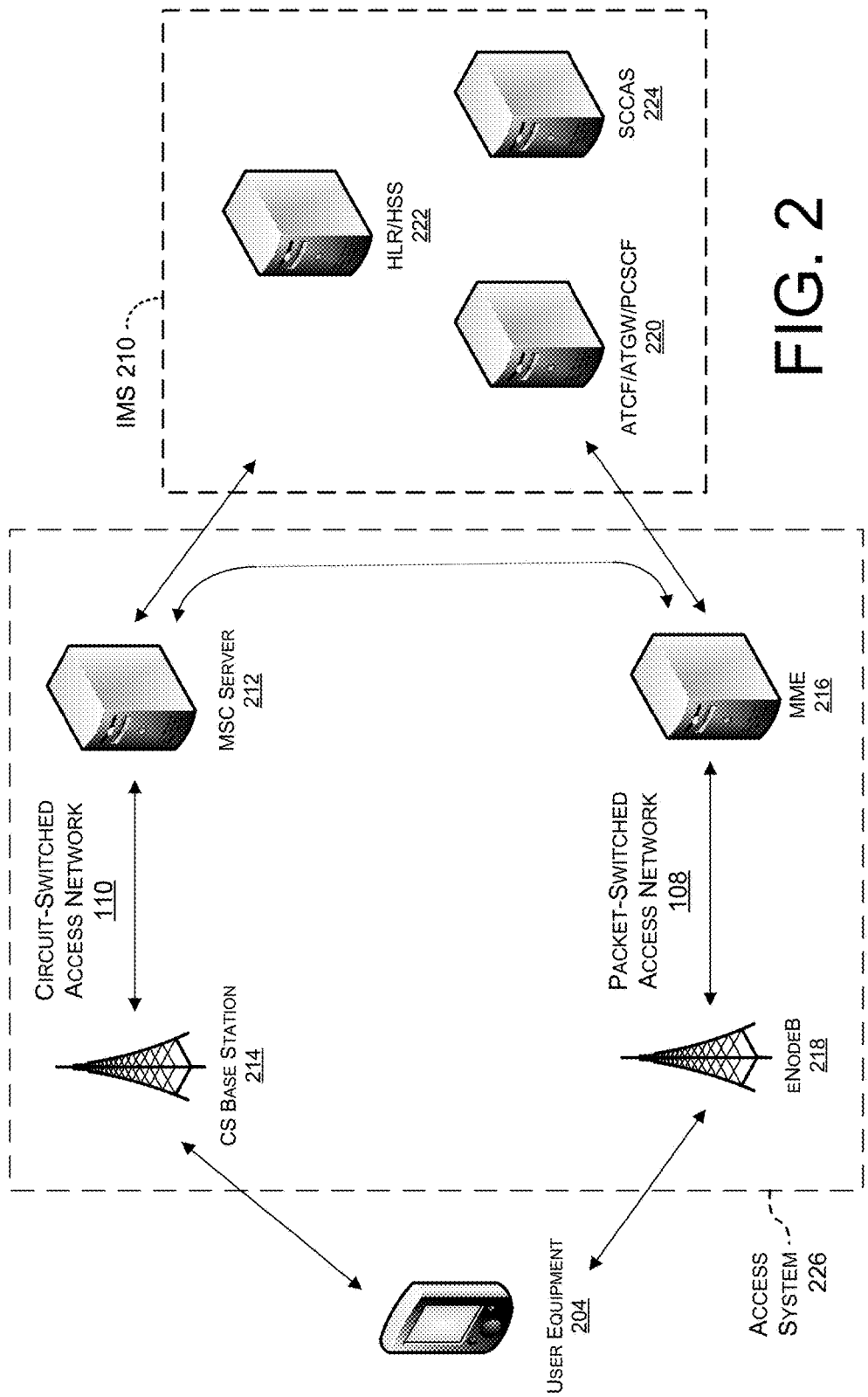
FIG. 2 illustrates an example telecommunication network, including components used to re-initiate the communication session during handover of the communication session.

The user equipment 106 may further be configured to initiate or receive a communication session, such as a voice call, a video call, or another sort of synchronous communication. Initiation of such communications may involve communication clients and session initiation protocol (SIP) clients to communicate with session continuity components 114 of the telecommunication network. Both the initiation of a communication session and the components involved in the initiation are illustrated in FIGS. 2 and 3 and described in further detail herein. As discussed herein, a communication session may be cancelled, e.g., on a first access network, and re-initiated, e.g., on a second access network. This may be transparent to the user; that is, a person using user equipment 106 may not experience any indication that a cancellation and re-initiation has occurred. Alternatively, any user-perceptible indication may be transitory, e.g., interruptions in audio of a voice call lasting less than one second. Handover 104 may include a cancellation and re-initiation managed by components of the telecommunications network (e.g., telecommunications network device 102, server 112, or session continuity component(s) 114).

In various embodiments, the user equipment 106 may measure access networks that are proximate to the user equipment 106 and provide measurements of those access networks in a measurement report to a device of the telecommunication network, such as telecommunication network device 102. The measurements may include signal strength, packet loss, packet discard, or network congestion. The proximate access networks may include both access networks that are detected by the user equipment 106 and those of neighboring cells, which the user equipment 106 may learn of from the telecommunication network.

The user equipment 106 may initiate the communication session using a connection to the packet-switched access network 108. The access network 108 may be secured using, for example, information from a SIM card of the user equipment 106, or may be unsecure. The access network 108 connects the user equipment 106 to a telecommunication network. A routing device of the access network 108 may communicate with a device of the telecommunication network, such as the telecommunication network device 102.

Figure 4:
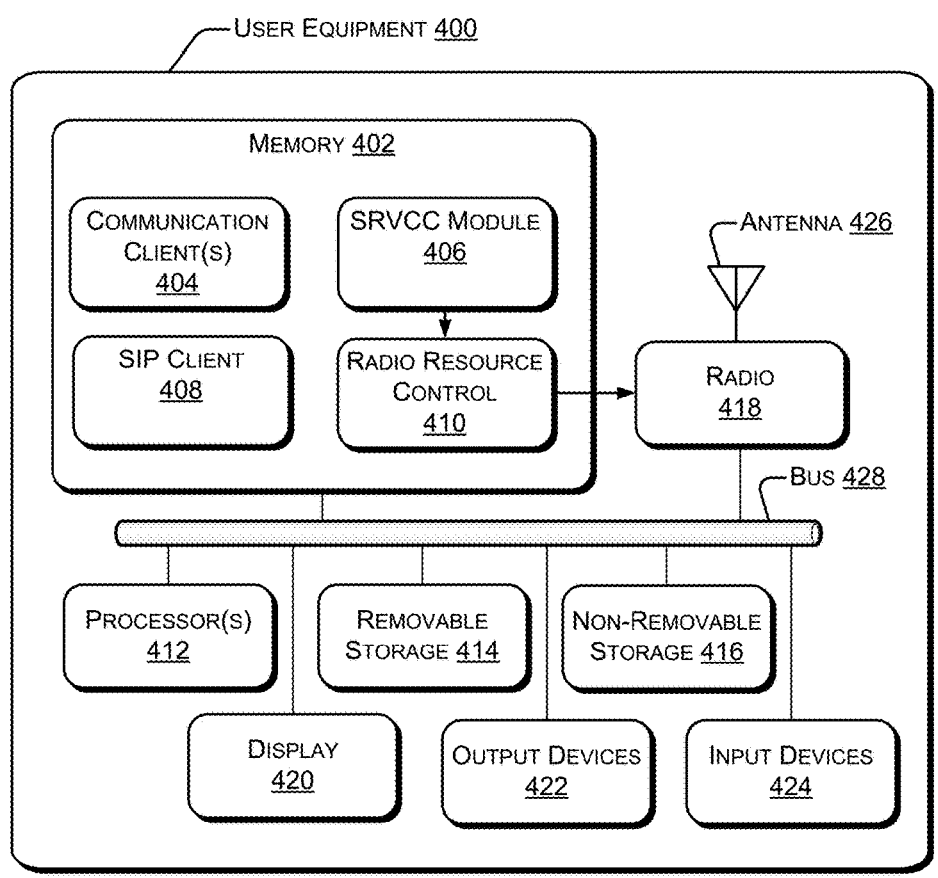
FIG. 4 illustrates a component level view of user equipment capable of connecting to a plurality of access networks, of measuring those access networks, of providing measurement reports, of engaging in a communication session, and of switching access networks used for the communication session.

The telecommunication network device 102 may be a gateway device, such as an Evolved Packet Data Gateway (ePDG). An example telecommunication network device 102 is illustrated in FIG. 4 and described below with reference to that figure. Further, the telecommunication network device 102, as well as the server 112 and the session continuity components 114, may each be or include a server or server farm, multiple, distributed server farms, a mainframe, a work station, a personal computer (PC), a laptop computer, a tablet computer, an embedded system, or any other sort of device or devices. In one implementation, one or more of telecommunication network device 102, the server 112, and the session continuity components 114 may represent a plurality of computing devices working in communication, such as a cloud computing network of nodes. Also, the telecommunication network device 102, the server 112, and the session continuity components 114 may each be or include devices of a telecommunication network. Examples of the telecommunication network device 102, the server 112, and the session continuity components 114 are illustrated in FIG. 2 and are described in greater detail with reference to that figure.

In various embodiments, the telecommunication network device 102 may enable the user equipment 106 to initiate the communication session by passing messages to appropriate device(s) of the telecommunication network, such as the session continuity components 114. The telecommunication network device 102 may also receive measurement reports from the user equipment 106 and may apply one or more models, thresholds, rules, or criteria to the measurements included in the measurement reports to determine whether a handover 104 is appropriate. For example, if the signal strength of the access network 108 falls below a threshold, the telecommunication network device 102 may initiate the handover 104. In other embodiments, the telecommunication network device 102 may select a circuit-switched access network 110 that is not included in the measurement reports to receive the handover. For example, the measurement reports may include measurements associated with the packet-switched access network 108, but no measurements for the circuit-switched access network 110. The telecommunication network device 102, as part of the telecommunication network, may have access to measurements of the circuit-switched access network 110, however, and may use those measurements in conjunction with those provided in the measurement reports in making a handover decision.

Upon initiating a handover 104, the telecommunication network device 102 selects a circuit-switched access network 110 to transition the communication session to. For example, the telecommunication network device 102 may select the circuit-switched access network 110 based on signal congestion levels of the circuit-switched access networks included in the measurement report. The telecommunication network device 102 may then determine the server 112 associated with the selected circuit-switched access network 110 by referencing mappings, such as a table.

As part of the handover 104, the telecommunication network device 102 may send instructions to the user equipment 106 preparing the user equipment 106 for the handover 104. Such instructions may include a directive to automatically tune the radio of the user equipment 106 to the circuit-switched access network 110 if the user equipment 106 has not heard from the telecommunication network device 102 within a threshold period of time.

The telecommunication network device 102 then sends a handover request, such as a SRVCC packet-switched (PS) to circuit-switched (CS) request. The request may be made over an interface between the telecommunication network device 102 and the server 112. In an example, the telecommunication network device 102 can be or include an MME, which may have an SV interface with the server 112. The handover request may include at least information identifying the user equipment 106, such as an international mobile subscriber identity (IMSI), information identifying the communication session, such as a correlation mobile station international subscriber directory number (C-MSISDN), and an identifier of the session continuity components 114, such as a session transfer number-single radio (STN-SR).

In some embodiments, the server 112 may be an MSS associated with the circuit-switched access network 110. The circuit-switched access network 110 may be any sort of circuit-switched access network 110, such as a GSM or UMTS network. The circuit-switched access network 110 may also be referred to as a universal terrestrial radio network (UTRAN) or a GSM EDGE radio access network (GERAN) and may include a base station or NodeB, as well as a radio network controller (RNC). The circuit-switched access network 110 may provide circuit-switched connections over a given signal spectrum and may use any sort of air interface, such as a code division multiple access (CDMA), time division multiple access (TDMA), or frequency division multiple access (FDMA) air interface. Communications received by the circuit-switched access network 110 from the user equipment 106 are transmitted to a server 112 of the telecommunication network, such as an MSS.

Upon receiving a handover request, the server 112 prepares the circuit-switched access network 110 for the handover 104 by, for example, allocating resources at a base station and RNC of the circuit-switched access network 110.

The server 112 also uses the identifier of the session continuity components 114 included in the handover request to request that the session continuity components perform a session transfer. The session transfer enables the handover 104 to occur without loss of continuity to the communication session.

In various embodiments, the session continuity components 114 represent components of an IMS of the telecommunication network. Examples of such components, and of the session transfer, are described further herein. Upon receiving a session transfer request from the server 112 and performing the session transfer, the session continuity components 114 respond to the server 112, indicating completion of the session transfer.

In further embodiments, upon receiving a response indicating completion of the session transfer, and after preparing the circuit-switched access network 110 for the handover 104, the server 112 (e.g., an MSS) sends a handover response, such as an SRVCC PS to CS response, to the telecommunication network device 102 (e.g., an MME). The telecommunication network device 102 then instructs the user equipment 106 to tune its radio to the circuit-switched access network 110 in order to connect to the circuit-switched access network 110 and continue the communication session. Upon receiving such instructions, the user equipment 106 carries them out, completing the handover 104.

A handover 104 can be initiated at any time during a voice call or other persistent communication session. As noted above, the Session Initiation Protocol (SIP, RFC 3261) can be used to establish and manage communication sessions. A communication session typically passes through several phases over its life. These are described with reference to a voice call in the circuit-switched domain but are not limited thereto. For LTE, the phases are defined in 3GPP TS 24.237 version 12.6.0 Release 12, p. 19 and in 3GPP TS 24.229 version 10.9.0 Release 10, pp. 96-98, or subsequent versions of those standards.

To initiate a communication session, e.g., in response to a user's dialing a phone number, originating user equipment 106 sends a SIP INVITE request via access network 108 to terminating user equipment 116. This begins a "pre-alerting" phase of the session. The terminating user equipment 116 responds with a SIP response carrying a 180 response code, signifying "Ringing." This begins an "alerting" phase of the session, during which the terminating user equipment 116 provides an indication that a call is incoming Examples of indications include vibrations and audible ringtones. The SIP response is referred to as a "SIP 180 Ringing response", and likewise for other SIP response codes described herein. A SIP response code ending in "xx", e.g., a SIP 1xx Provisional response, signifies any response of, e.g., class 1 of SIP responses (RFC 3261, § 7.2).

When terminating user equipment 116 accepts the communication session (e.g., a user of device 116 chooses to answer the call), terminating user equipment 116 sends a SIP 200 OK response to originating user equipment 106. This begins an "established" phase of the communication session, during which data can be exchanged between originating user equipment 106 and terminating user equipment 116. In an example, the data includes digitized audio of a voice call. The alerting and pre-alerting phases are referred to collectively as a "pre-establishment phase." The pre-establishment phase corresponds to a SIP "early dialog state" and the established phase corresponds to a SIP "confirmed dialog state" (RFC 3261, § 12).

However, in some telecommunication networks, some telecommunication network devices or session continuity components support handovers during the pre-establishment phase ("pre-establishment handovers") and others do not. In an example, server 112, e.g., an MSS, supports pre-establishment handovers, but at least one of the session continuity components 114, e.g., ATCF 220 described below with reference to FIG. 2, does not support pre-establishment handovers. As a result, pre-establishment handovers can terminate in dropped calls (or other prematurely terminated communication sessions) because, e.g., user equipment 106 or 116 transitions between access networks but the session continuity components 114 do not. Handovers can be triggered or required at any time during a communication session, including during the pre-establishment phase, e.g., due to declines in signal strength as user equipment 106, 116 moves, it is desirable to reduce the occurrence of call drops due to pre-establishment handovers.

Example Telecommunication Network

FIG. 2 illustrates an example telecommunication network. User equipment 204 communicates with access system 226 of the telecommunication network, including an MME 216 associated with a packet-switched access network 108 and a MSS 212 associated with a circuit-switched access network 110. IP multimedia subsystem (IMS) 210 communicates with access system 226 and provides media-handling services, e.g., to route video or voice data and to provide a substantially consistent service to the users involved in a communication session even during handover of the communication session or when the communication session is cancelled and subsequently re-initiated. The circuit-switched access network 110 may include a CS base station 214 that provides connectivity to the circuit-switched access network. The MME 216 may enable connectivity to the telecommunication network through a packet-switched access network 108, e.g., an LTE access network, which includes an eNodeB 218. The IMS 210 of the telecommunication network may include a number of nodes, such as an access transfer control function (ATCF)/access transfer gateway (ATGW)/proxy call session control function (PCSCF) 220, a home location register (HLR)/home subscriber server (HSS) 222, and a service centralization and continuity application server (SCCAS) 224.

The telecommunication network may also include a number of devices or nodes not illustrated in FIG. 2. Such devices or nodes may include a visitor location register (VLR), a serving general packet radio service (GPRS) support node (SGSN), a gateway GPRS support node (GGSN), a policy control rules function (PCRF) node, a serving gateway (S-GW), a session border controller (SBC), or a media gateway. IMS 210 may further include a number of devices or nodes not illustrated in FIG. 2, such as a presence server, a telephony application server (TAS), and one or more call session control functions (CSCF). A core network of the telecommunication network may be a GPRS core network or an evolved packet core (EPC) network, or may include elements from both types of core networks. The telecommunication network may provide a variety of services to user equipment 204, such as synchronous communication routing across a public switched telephone network (PSTN). Further services may include call control, switching, authentication, billing, etc. In at least one example, IMS 210 functions and devices communicate using specific services provided by the access system 226 or elements thereof but are not directly tied to those specific services. For example, IMS 210 devices can intercommunicate using an EPC network, a GSM network, a SONET network, or an Ethernet network.

The devices and networks illustrated in FIG. 2 may be examples of the devices and networks illustrated in FIG. 1 and described above. For instance, the MME 216 may be a telecommunication network device 102, the user equipment 204 may be user equipment 106, the IMS 210 and its components 220-224 may be session continuity components 114, and the MSS 212 may be a server 112. Also, the eNodeB 218 may be an access point for the packet-switched access network 108, and the CS base station 214 may be a base station for the circuit-switched access network 110. Accordingly, the descriptions of the devices and networks of FIG. 1 apply to the devices and networks of FIG. 2.

The devices and networks of FIG. 2 may cooperate to accomplish the handover 104 shown in FIG. 1 and described above. They may also cooperate to accomplish the initialization of a communication session of user equipment 204 and to provide a session transfer number (STN) identifying the IMS 210.

In initializing the communication session, the user equipment 204 must register the communication session with the IMS 210 of the telecommunication network. To do this, the user equipment 204 sends an initiation SIP register request to the IMS 210 via the eNodeB 218 and MME 216. A P-CSCF of the IMS 210 may receive the SIP register request, and may provide the SIP register request to the ATCF/ATGW 220 of the IMS 210. The ATCF/ATGW 220 allocates a session transfer number, such as an STN-SR, and includes the STN-SR in the SIP register request to ensure that the ATCF is included in the signaling path for future SIP requests, such as session transfer requests from MSSs 212. The ATCF/ATGW 220 then sends the SIP register request to an interrogating call session control function (I-CSCF)/serving call session control function (S-CSCF), which in turn sends the SIP register request to the SCCAS 224. Alternatively, the STN-SR may be allocated by and associated with the SCCAS 224. The SCCAS 224 then sends a pull message to the HLR/HSS 222 to determine whether the user equipment 204 is SRVCC capable and to retrieve an STN-SR stored in the HLR/HSS 222. If the STN-SR received from the HLR/HSS 222 differs from the STN-SR included in the SIP register request, the SCCAS 224 updates the HLR/HSS 222 with the STN-SR included in the SIP register request. The SCCAS 224 may then send a SIP register response to the user equipment 204 to complete the IMS registration of the communication session.

In various embodiments, the STN which identifies the IMS 210 during an attach procedure can be determined by the MME 216, which can perform the location update and receive the STN via an Insert Subscriber Data message from the HLR/HSS 222.

An example handover 104 of a communication session of user equipment 106 from packet-switched access network 108 to a circuit-switched access network 110 is described above. In order to relate an example handover in further detail, and with reference to the devices and networks of FIG. 2, a further example handover is described. In this example, the communication session subject to the handover is a communication session of the user equipment 204 that uses packet-switched access network 108. Such a communication session may, for instance, be a voice-over-LTE (VoLTE) voice call. In the illustrated configuration, access system 226 and IMS 210 have separate handover procedures that operate in parallel to complete a handover.

In various embodiments, the user equipment 204 may send measurement reports to the eNodeB 218. The user equipment 204 can, for example, measure access networks based on measurement gap instructions and include those measurements in the measurement reports. Measurement gap instructions may be received by the user equipment 204 and utilized to create gaps in the communication session and to use those gaps to tune the radio to the different access networks and to obtain measurements for those access networks. The measurement gap instructions may be provided by any node or device of the telecommunication network.

These measurement reports may include measurements of the packet-switched access network 108, e.g., a LTE access network provided by the eNodeB 218, or of a circuit-switched access network 110 provided by the CS base station 214. Alternatively, the measurement reports may include only measurements of a subset of those access networks. Such measurements may include signal strength, packet loss, packet discard, or network congestion. The eNodeB 218 may apply models, thresholds, rules, or criteria to the measurements and may initiate a handover based on the application of those models, thresholds, rules, or criteria to the measurements.

As mentioned above, the MME 216 may consider measurements for access networks not included in the measurement reports. For example, the measurement reports may include measurements for an LTE or other packet-switched access network 108, but not for the circuit-switched access network 110. The eNodeB 218 may have access to measurements of the circuit-switched access network 110 and may use those measurements, in conjunction with those reported in the measurement reports, in making the handover decision.

Upon initiating the handover, the MME 216 may select the circuit-switched access network 110 to receive the communication session. Such a selection may also be based on one or more measurement report(s), other measurements known to the telecommunication network, or any combination thereof. The MME 216 may also send instructions to the user equipment 204 to prepare the user equipment for the handover. Such instruction may include, for example, a directive to automatically tune the radio of the user equipment to the circuit-switched access network 110.

The MME 216 may then provide a handover request, e.g., a SRVCC PS to CS request. The handover request may include an IMSI for the user equipment 204, the STN-SR, a C-MSISDN for the communication session, a generic source to target transparent container, a mobility management (MM) context, and an emergency indication. The MME 216 may make the handover request of the MSS 212.

In various embodiments, upon receiving the handover request, the MSS 212 performs resource allocation with the target CS base station 214 by exchanging handover request/acknowledgement messages with the CS base station 214. Once the MSS 212 has determined that the CS base station 214 can accept user equipment 204, the MSS 212 then sends a handover response to the MME 216. Such a handover response may be a SRVCC PS to CS response, which may include a target to source transparent container. The MME 216 then sends a handover command message to the user equipment 204 via eNodeB 218, instructing the user equipment 204 to tune its radio to the circuit-switched access network 110 of the CS base station 214. Handover detection then occurs at the CS base station 214, and the CS base station 214 sends a handover complete message to the MSS 212. This concludes handover of access system 226.

The MSS 212 also initiates a session transfer by sending a SIP INVITE request, which includes the STN-SR, to the IMS 210, e.g., to ATCF 220. The STN-SR is used to direct the SIP INVITE request to the correct component of IMS 210.

In at least one example, the STN-SR is associated with the ATCF 220. The ATCF 220 receives the SIP INVITE request and switches the session from the source access leg, i.e., network port(s) or other connection(s) to user equipment 204 via packet-switched access network 108, to the CS access leg, i.e., network port(s) or other connection(s) to user equipment 204 via circuit-switched access network 110. ATCF 220 then sends a SIP INVITE request to the SCCAS 224 to inform the SCCAS 224 of the switch and cause it to release the source access leg, and responds to the SIP INVITE request of the MSS 212, completing the session transfer. The media remains anchored at the ATGW 220 during the session transfer, and the conversation partner device is not made aware of session transfer. This concludes handover of the IMS 210, which is in general not aware of the state of access system 226 or any other transport underlying the IMS 210. Similarly, the underlying transport (e.g., access system 226) is in general not aware of the state of the IMS 210.

FIG. 3 shows an example call flow 300 illustrating an example handoff failure in prior systems. In FIG. 3 and other call flows herein, boxes across the top and vertical lines descending from those boxes represent user equipment 400, FIG. 4, or telecommunication network devices 500, FIG. 5 (collectively, "nodes"). Time increases down the page. Arrows between the vertical lines represent messages between nodes. Moreover, for this and other call flows herein, some components and messages are omitted for brevity. In the illustrated example, eNodeB 218 triggers a handoff based on a measurement report from user equipment 204, as discussed below.

As discussed above, some telecommunication networks, and specifically some implementations of IMS 210, do not support SRVCC during the pre-establishment phase. In these networks, the handover from eNodeB 218 to CS base station 214 in access system 226 can succeed but the IMS 210 handover can fail, resulting in a dropped call. In FIG. 3, signals related to the access system 226 are shown solid; signals related to the IMS 210 are shown dashed. "Req" stands for "request" and "Ack" stands for "acknowledgement." "Cmd" stands for "command." "Resp" stands for "response."

As discussed above, in the telecommunications network, user equipment 204 ("UE"; also referred to as a "user device") provides a measurement report ("Msmt Rpt") to eNodeB 218. The measurement report can indicate that LTE signal strength (SS) is below a selected lower limit. This can occur, e.g., when UE 204 is near the edge of the coverage area of eNodeB 218, or when UE 204 is in a building or otherwise shadowed from signals from eNodeB 218.

In response to the measurement report, eNodeB 218 requests a handover ("HO Req") from MME 216. MME 216 sends the SRVCC PS to CS request to MSS 212, which in turn negotiates with the CS base station 214 ("CS BS") vi the "HO Req" and "HO Req Ack". The Ack is passed back to MME 216 ("SRVCC PS to CS Resp"), which commands eNodeB 218 to handover the call ("HO Cmd"). The eNodeB 218 then commands the UE 204 to switch radios from packet-switched frequencies and protocols to circuit-switched frequencies and protocols ("Mobility Cmd"). At block 302, the UE 204 terminates communication with eNodeB 218 and commences communicating with CS base station (BS) 214. UE 204 then advises CS BS 214 that the handover is complete ("HO Complete"). CS BS 214 in turn advised MSS 212 ("HO Complete"), which advises MME 216 ("SRVCC Complete") and receives confirmation from MME 216 ("SRVCC Complete ACK"). MME 216 then directs eNodeB 218 to release resources formerly associated with the communication session ("UE Context Release").

In parallel with the handover in the telecommunication network, the IMS 210 is conducting a handover. When MSS 212 receives the HO REQ ACK from the CS BS 214, MSS 212 sends a SIP INVITE to ATCF 220 in IMS 210, FIG. 2. The SIP INVITE directs IMS 210 to change the data flow in the communication session from the PS access network 108 to the CS access network 110. ATCF 220 responses with a SIP 100 Trying response, indicating the transfer has begun but is not yet complete. As indicated in 3GPP TS 23.216 version 12.1.0 Release 12, p. 37, Note 4, MSS 212 is not required to wait for a SIP 2xx Success response before sending the SRVCC PS to CS Resp to MME 216. This is because IMS 210 is independent of the access network carrying the multimedia traffic (3GPP TS 23.228 version 11.10.0 Release 11, p. 23).

In the example shown, ATCF 220 is not able to accept the handover, e.g., because UE 204 is in an alerting or pre-alerting stage. Accordingly, ATCF 220 sends a SIP 488 Not Acceptable response to MSS 212. However, in this example, MSS 212 does not receive the SIP 488 until after UE 204 has moved to the CS BS 214. Accordingly, UE 204 is communicating via circuit-switched access network 110 but IMS 210 is still communicating via packet-switched access network 108. The result is, e.g., silence on the line during a voice call. After a timeout period with no communication, UE 204 drops the call or other communication session (block 304).

Example Devices

FIG. 4 illustrates a component level view of user equipment 400 capable of connecting to a plurality of access networks, of measuring those access networks, of providing measurement reports, of engaging in a communication session, and of switching access networks during the communication session. The user equipment 400 may be any sort of user equipment, such as user equipment 106, 116, or 204. As illustrated, the user equipment 400 comprises a system memory 402 storing communication client(s) 404, SRVCC module 406, SIP client 408, and radio resource control 410. Also, the user equipment 400 includes processor(s) 412, a removable storage 414, a non-removable storage 416, radio 418, a display 420, output device(s) 422, input device(s) 424, and one or more antenna(s) 426 connected to radio 418. Processor 412, radio 418, system memory 402, and other illustrated components of user equipment 400 can be communicatively coupled via bus 428, e.g., a PCI or other computer bus.

In various embodiments, system memory 402 is volatile (such as RAM), non-volatile (such as ROM, flash memory, etc.) or some combination of the two. The communication client(s) 404 stored in the system memory 402 may enable the user equipment 400 to initiate and carry on communication sessions. The communication client(s) 404 may include voice call handlers, video calling clients, gaming and media clients, etc. The communication client(s) 404 may utilize a policy, preferences, etc. in determining which of a number of available access networks the communication client(s) 404 should use in initiating communication sessions. For example, the communication client(s) 404 may utilize a policy or preference that prefers LTE access networks to GSM access networks, and GSM access networks to other circuit-switched access networks.

The SRVCC module 406 may perform a number of functions, such as interfacing with the radio 418 through the radio resource control 410, receiving instructions, such as measurement gap instructions, instructions preparing the user equipment 400 for a handover, and instructions to complete a handover by tuning the radio 418, performing measurements of access networks, generating measurement reports that include the measurements, and providing the measurement reports to the telecommunication network. Further details of functions that may be performed by SRVCC module 406 are discussed below with reference to FIGS. 6-15.

The SIP client 408 may participate with the communication client(s) 404 in initiating a communication session by, for example, formulating a SIP REGISTER request and sending the SIP REGISTER request to the telecommunication network.

The radio resource control 410 may, for example, be a radio resource control layer of the user equipment 400 and may interact with the radio 418 and other modules and components of the user equipment 400 in order to tune the radio 418 and communicate using the radio 418.

In some embodiments, the processor(s) 412 is a central processing unit (CPU), a graphics processing unit (GPU), or both CPU and GPU, or any other sort of processing unit. Example processing units include Field-programmable Gate Arrays (FPGAs), Application-specific Integrated Circuits (ASICs), Application-specific Standard Products (AS SPs), System-on-a-chip systems (SOCs), Complex Programmable Logic Devices (CPLDs), Digital Signal Processors (DSPs), and processors incorporating more than one type of device (e.g., a CPU and an FPGA on a single die).

User equipment 400 also includes additional data storage devices (removable and/or non-removable) such as, for example, magnetic disks, optical disks, or tape. Such additional storage is illustrated in FIG. 4 by removable storage 414 and non-removable storage 416. Tangible computer-readable media may include volatile and nonvolatile, removable and non-removable media implemented in any method or technology for storage of information, such as computer readable instructions, data structures, program modules, or other data. System memory 402, removable storage 414 and non-removable storage 416 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the user equipment 400. Any such tangible computer-readable media may be part of the user equipment 400.

In some embodiments, the radio 418 includes any sort of radio known in the art. For example, radio 418 may be a radio transceiver that performs the function of transmitting and receiving radio frequency communications. The radio interface may facilitate wireless connectivity between the user equipment 400 and various cell towers, base stations and/or access points of access networks, e.g., packet-switched or circuit-switched networks.

In various embodiments, the display 420 is a liquid crystal display, organic light-emitting diode (OLED) display, or any other type of display commonly used in telecommunication devices. For example, display 420 may be a touch-sensitive display screen, and can then also act as an input device or keypad, such as for providing a soft-key keyboard, navigation buttons, or the like.

In some embodiments, the output devices 422 include any sort of output devices known in the art, such as a display (already described as display 420), speakers, a vibrating mechanism, or a tactile feedback mechanism. Output devices 422 also include ports for one or more peripheral devices, such as headphones, peripheral speakers, or a peripheral display.

In various embodiments, input devices 424 include any sort of input devices known in the art. For example, input devices 424 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 5:
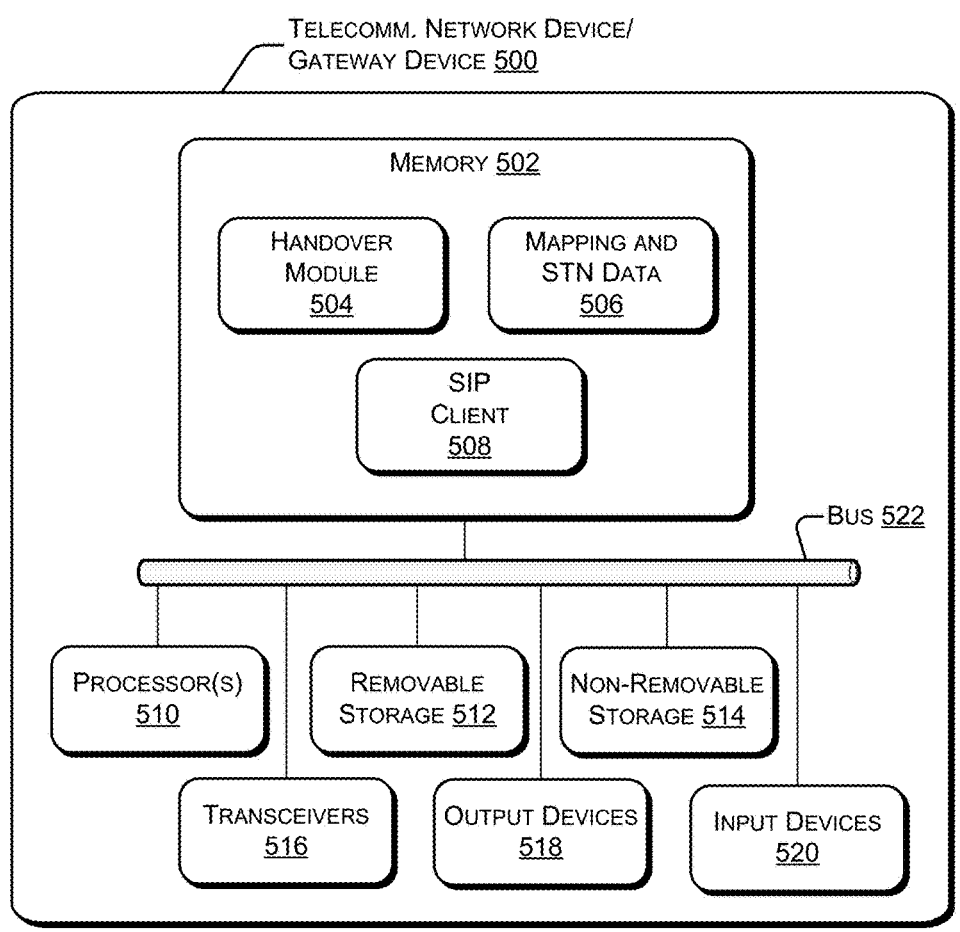
FIG. 5 illustrates a component level view of a telecommunication network device capable of initiating and managing a handover of a communication session of user equipment from a packet-switched access network to a circuit-switched access network.

FIG. 5 illustrates a component level view of a telecommunication network device 500 capable of initiating and managing a handover of a communication session of user equipment from a packet-switched access network to a circuit-switched access network. The telecommunication network device 500 may be any sort of user equipment, such as telecommunication network device 102, MSS 212 or MME 216. As illustrated, the telecommunication network device 500 comprises a system memory 502 storing a handover module 504, mappings and STN data 506, and a SIP client 508. Also, the telecommunication network device 500 includes processor(s) 510, a removable storage 512, a non-removable storage 514, transceivers 516, output device(s) 518, and input device(s) 520, any or all of which can be communicatively connected via bus 522.

In various embodiments, system memory 502 is volatile (such as RAM), non-volatile (such as ROM, flash memory, etc.) or some combination of the two. The handover module 504 stored in the system memory 502 may perform a number of functions, including initiating a handover of a communication session based on measurement reports, selecting a circuit-switched access network for the handover, providing a handover request to a server associated with the circuit-switched access network, either directly or through an MME, receiving a handover response, and instructing the user equipment to connect to the circuit-switched access network to complete the handover. The handover module 504 may also provide measurement gap instructions to user equipment and instruct the user equipment to prepare for a handover. Further details of functions that may be performed by handover module 504 are discussed below with reference to FIGS. 11-13 and 15.

The mapping and STN data 506 may include mappings of circuit-switched access networks to servers, such as MSSs, and mappings of proxy call session control functions (P-CSCFs) to ATCFs and STN-SRs.

The SIP client 508 may enable user equipment to perform a SIP registration for a communication session with an IMS or other session continuity components.

In some embodiments, the processor(s) 510 is a central processing unit (CPU), a graphics processing unit (GPU), or both CPU and GPU, or any other sort of processing unit described above with reference to processor 412.

The telecommunication network device 500 also includes additional data storage devices (removable and/or non-removable) such as, for example, magnetic disks, optical disks, or tape. Such additional storage is illustrated in FIG. 5 by removable storage 512 and non-removable storage 514. System memory 502, removable storage 512 and non-removable storage 514 are all examples of computer-readable storage media. Tangible computer-readable media and computer-readable storage media can be as discussed above with reference to removable storage 414 and non-removable storage 416.

In some embodiments, the transceivers 516 include any sort of transceivers known in the art. For example, transceivers 516 may include a radio transceiver that performs the function of transmitting and receiving radio frequency communications. Also, or instead, the transceivers 516 may include other wireless or wired connectors, such as Ethernet connectors or near-field antennas. The transceivers 516 may facilitate connectivity between a public network, such as packet-switched access network 108, and one or more other devices of a telecommunication network.

In some embodiments, the output devices 518 include any sort of output devices known in the art, such as a display, speakers, a vibrating mechanism, or a tactile feedback mechanism. Output devices 518 also include ports for one or more peripheral devices, such as headphones, peripheral speakers, or a peripheral display.

In various embodiments, input devices 520 include any sort of input devices known in the art. For example, input devices 520 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

FIGS. 6, 8, 10, 11, 12, 14, and 15 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Similarly, the order of data exchanges shown in example call flows of FIGS. 7, 9, and 13 is not intended to be construed as a limitation.

Figure 6:
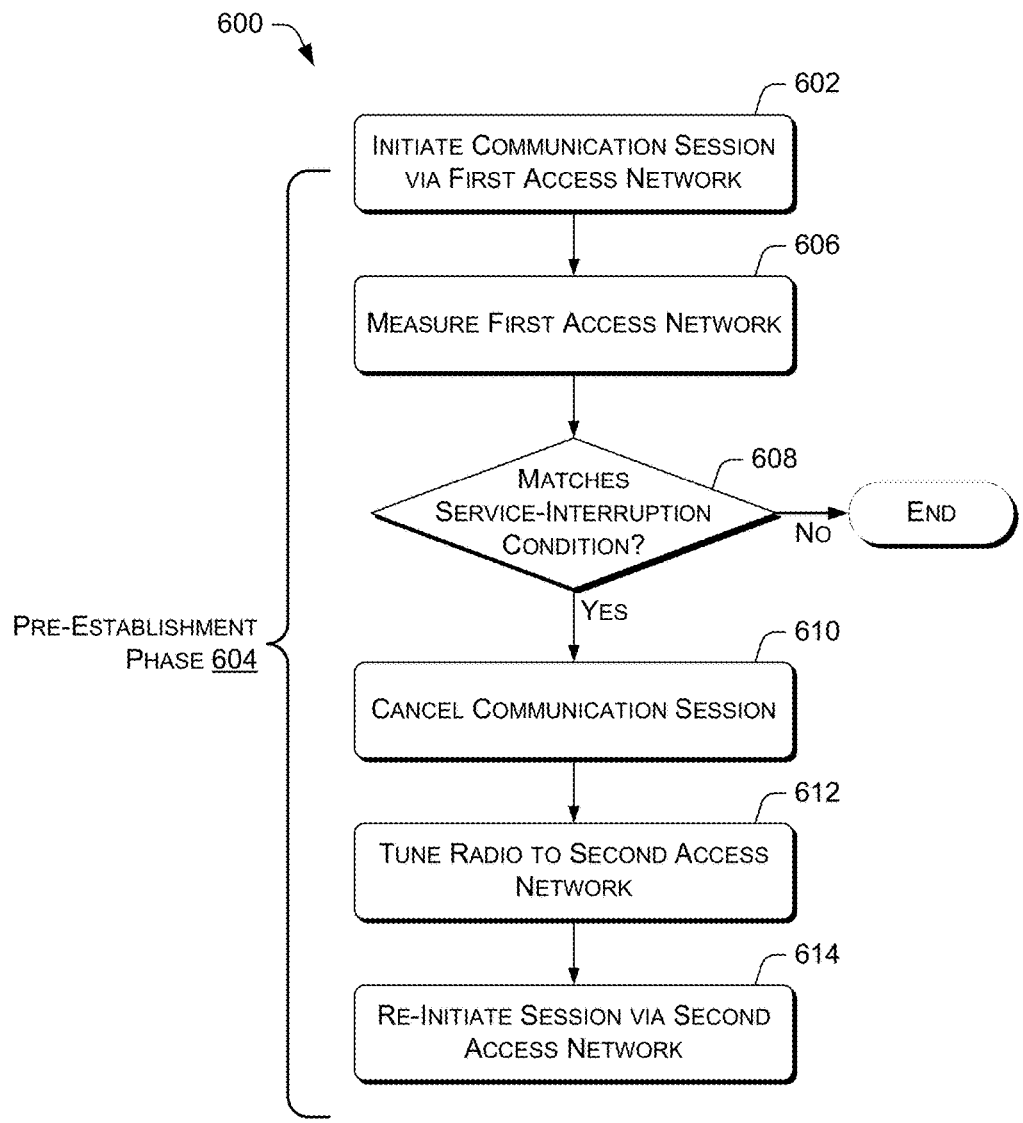
FIG. 6 illustrates an example process performed by, e.g., originating user equipment for re-initiating a communication session during, e.g., the alerting or pre-alerting phases.
Figure 7:
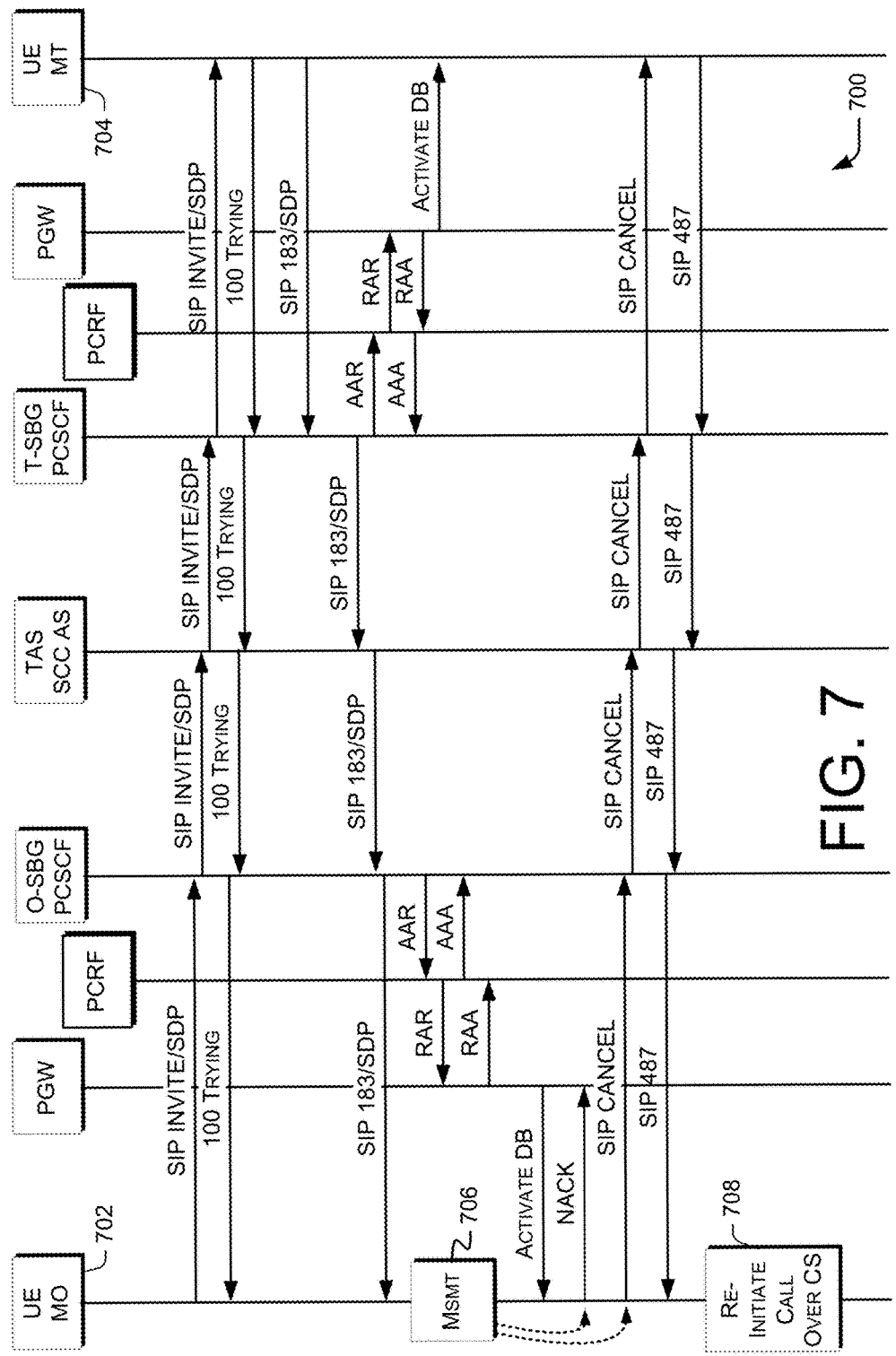
FIG. 7 is a call flow showing an example of the process shown in FIG. 6.

FIG. 6 illustrates an example process 600 performed by user equipment for re-initiating a communication session during, e.g., the alerting or pre-alerting phases. In some examples, the user equipment is originating user equipment of a communication session. Re-initiating can provide the user of the user equipment with the perception of a substantially uninterrupted communication session even in the presence of cancellations.

The process includes, at 602, selectively initiating a communication session with another device via a first access network of a first type, e.g., a packet-switched type. The initiating can include a SIP INVITE request, a SIP 100 Trying response, or another signal establishing participation of the user equipment in a SIP dialog or other communication session. A pre-establishment phase 604 follows or commences with the initiation of the communication session and precedes establishment of the communication session.

At 606, during the pre-establishment phase, the first access network is selectively measured to provide a measurement. The measurement can be performed once, multiple times, intermittently, periodically, sporadically, or continually. The measurement may include, e.g., at least one of signal strength, packet loss, packet discard, or network congestion.

At 608, the user equipment determines whether the measurement corresponds to a service-interruption condition. If not, the method may terminate. If so, the next block is block 610. In some examples, the measurement may include signal strength and the service-interruption condition may include a lower limit of the signal strength. The user equipment may determine that the measured signal strength corresponds to such a condition if, e.g., the signal strength is less than (or less than or equal to) the lower limit, and likewise for other lower limits discussed herein. In some examples, the lower limit may be −114 dBm, or −120 dBm, or a value that is less than −100 dBm, between −100 dBm and −124 dBm, between −100 dBm and −109 dBm, between −100 dBm and −119 dBm, or between −110 dBm and −122 dBm. The lower limit may be selected based at least in part on terminal type and network technology.

At 610, the communication session is cancelled. The user equipment may transmit a NACK or a SIP CANCEL request to cancel the communication session. As used herein, the term "cancelled" refers to ceasing communication via a particular channel or access network, e.g., packet-switched access network 108. "Cancellation" does not relate to the other device, e.g., the peer with which the user equipment is communicating.

At 612, the radio of the user equipment is tuned, e.g., automatically under software control, to communicate with a second access network of a second, different type. The second type can be, e.g., a circuit-switched type. Tuning may include adjusting parameters of the baseband, modulator, demodulator, or other components of the radio. Tuning may include adjusting frequencies of oscillators in the radio or changing the routing of packets in processor(s) 412 or other components of the user equipment.

At 614, the communication session is re-initiated with the other device via the second access network. In some examples, the user equipment can transmit a SIP INVITE request to re-initiate the communication session.

FIG. 7 is a call flow 700 showing an example of the process shown in FIG. 6. The call flow of FIG. 7 is between an originating UE 702 ("UE MO") and a terminating UE 704 ("UE MT"). Originating UE 702 has placed the call or otherwise initiated the communication session. Terminating UE 704 is the target of the communication session. The described components are: a public data network gateway (PGW), a Policy Control and Charging Rules Function (PCRF), an Originating Session Border Gateway/Proxy Call Session Control Function (O-SBG/PCSCF), a telephone application server or single-radio call continuity application server (TAS/SCC AS), and a Terminating Session Border Gateway/Proxy Call Session Control Function (T-SBG/PCSCF).

In call flow 300, discussed above, eNodeB 218 triggers the handover. In contrast, in call flow 700, originating UE 702 triggers a handover before eNodeB 218 does so. In this way, even if ATCF 220 does not support handover during the alerting or pre-alerting state, handover can be completed by the originating UE 702.

As shown, originating UE 702 sends a SIP INVITE message to initiate the communication session (block 602). The INVITE includes Session Description Protocol ("SDP") data indicating properties of the communications session. The pre-establishment phase begins when or after the SIP INVITE is sent. The INVITE is passed through the telecommunications network to the terminating UE 704, which responds with a SIP 100 Trying response. Some time later, terminating UE 704 can optionally send a SIP 183 Session in Progress response carrying additional information about the session.

At some point in the pre-establishment phase, a measurement is taken. Measurement block 706 ("Msmt") represents operations of blocks 606, 608 discussed above. As indicated by the dashed lines, if the measurement corresponds to a service-interruption condition, originating UE 702 can take action to cancel the communication session (block 610). In some examples, originating UE 702 receives a message from a packet data network gateway ("PDG") to activate a dedicated bearer ("DB"), a bandwidth reservation to be used for communications across a data link. As indicated by the dashed lines, originating UE 702 can respond to the Activate DB message with a Negative Acknowledge ("NACK" or "NAK") message, preventing the dedicated bearer from being established. This prevents the access-network handover from taking place. Originating UE 702 can also or alternatively send a SIP CANCEL to the terminating UE 704, cancelling the communication session regardless of whether a dedicated bearer has been established.

After cancelling the communication session via the first access network, originating UE 702 can re-initiate the communication session via a second access network, e.g., a circuit-switched ("CS") access network. Block 708 can represent operations described with reference to blocks 612, 614.

Figure 8:
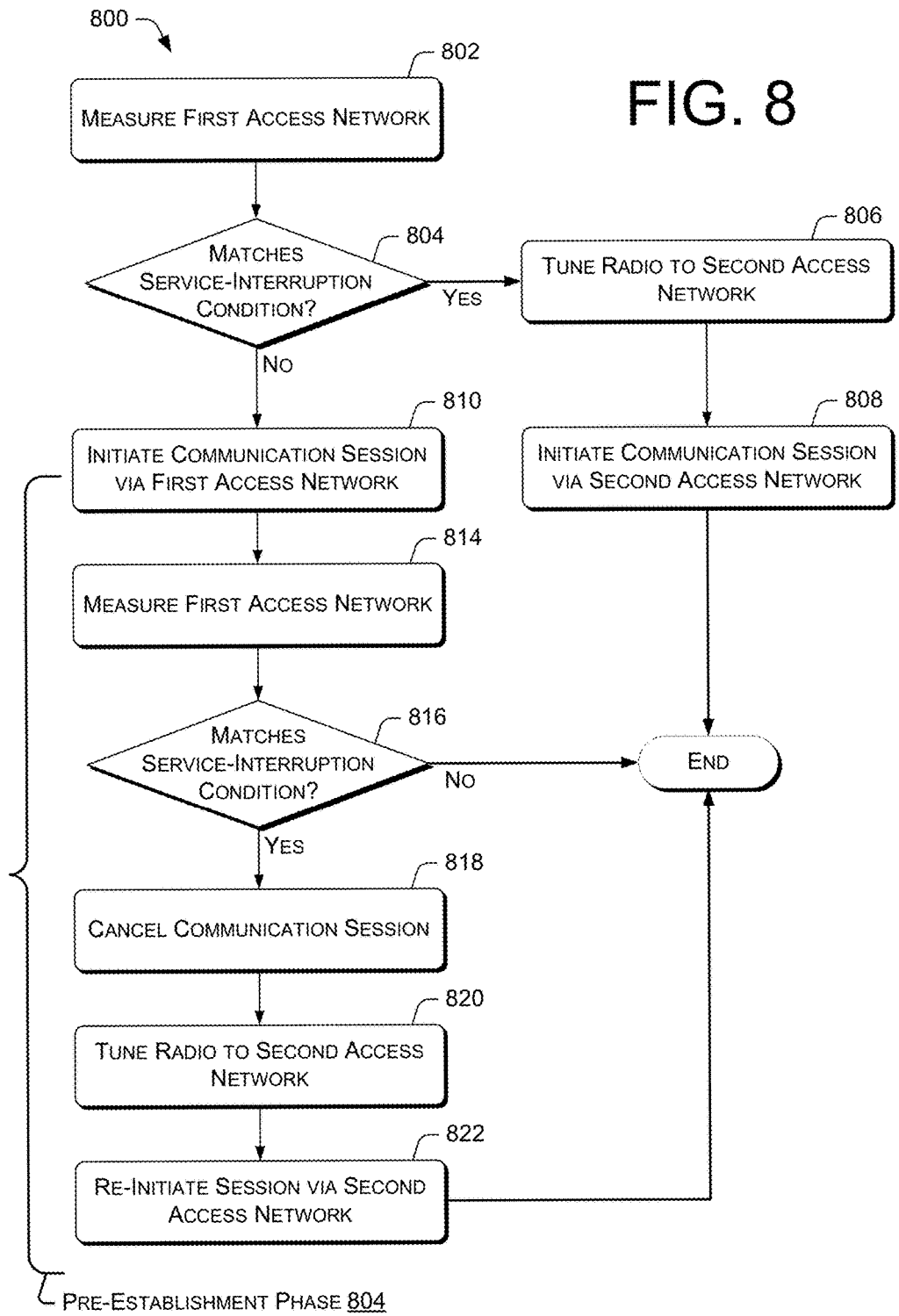
FIG. 8 illustrates an example process performed by, e.g., originating user equipment for re-initiating a communication session during, e.g., the alerting or pre-alerting phases.
Figure 9:
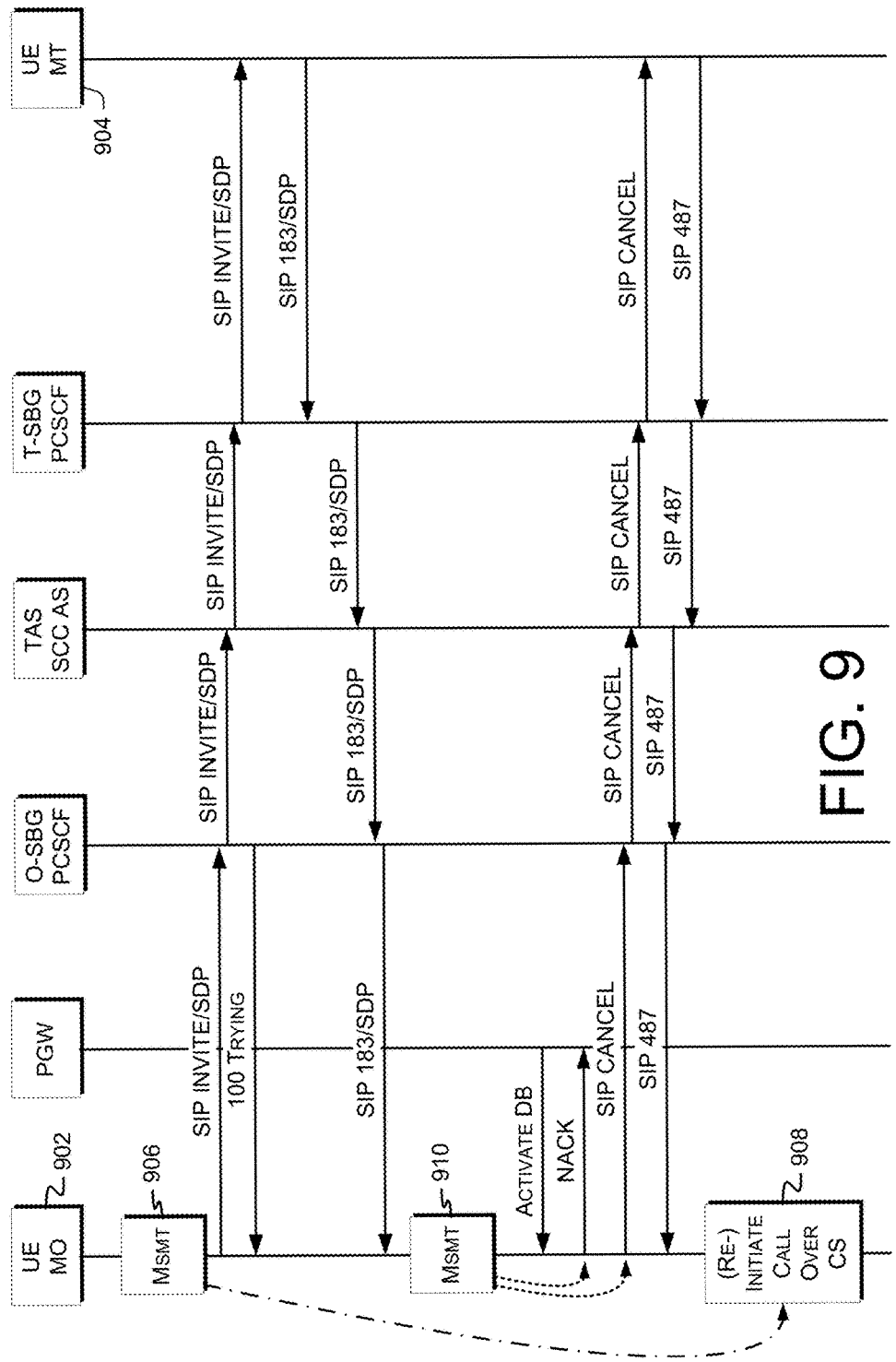
FIG. 9 is a call flow showing an example of the process shown in FIG. 8.

FIG. 8 illustrates an example process 800 performed by user equipment for re-initiating a communication session during, e.g., the alerting or pre-alerting phases. In some examples, the user equipment is originating user equipment of a communication session.

The process includes, at 802, prior to initiating, measuring the first access network to provide a measurement. The measurement may include at least one of signal strength, packet loss, packet discard, or network congestion.

At 804, the originating UE determines whether the measurement corresponds to a service-interruption condition, e.g., signal strength below a selected level. In some examples, the measurement may include signal strength and the service-interruption condition may include a lower limit of the signal strength, as discussed above. If not, block 804 can be followed by block 810. If so, block 804 can be followed by block 806. In this way, the initiating (block 810), additional measuring (block 814), and cancelling (block 818) may be bypassed if the signal strength is not high enough or another service-interruption condition is met.

At 806, the radio is tuned to communicate with the second access network of the second type, e.g., circuit-switched access network 110. This can be done, e.g., as described above with reference to block 612.

At 808, the communication session is initiated with the other device, e.g., user equipment 116, via the second access network. This can be done as described above with reference to block 614. However, unlike in block 614, block 808 represents initial establishment of a communication session via the second access network, rather than re-establishment of an existing communications session. Accordingly, the specific exchange of messages between components of the telecommunication network may differ between block 614 and block 808. After block 808, normal communications may commence.

If the measurement at block 802 did not correspond to the service-interruption condition, block 804 can be followed by block 810. At 810, the communication session is initiated via the first access network, e.g., as described above with reference to block 602. This begins pre-establishment phase 812, e.g., as described above with reference to pre-establishment phase 604.

At 814, the first access network is measured again to provide a subsequent measurement, e.g., as described above with reference to block 606. The subsequent measurement can be of the same type as the measurement taken in block 802 or of a different type. In an example, blocks 802, 814 may both measure signal strength. In an example, block 802 may measure signal strength and block 814 may measure wireless-network congestion.

At 816, it is determined whether the subsequent measurement corresponds to another service-interruption condition, e.g., as described above with reference to block 608. The service-interruption condition may be the same as described above with reference to block 804, or a different condition may be used, and likewise throughout.

At 818, the communication session is cancelled, e.g., as described above with reference to block 610.

At 820, the radio is tuned to communicate with the second access network. This can be done, e.g., as described above with reference to block 612.

At 822, the communication session is cancelled, e.g., as described above with reference to block 614.

FIG. 9 is a call flow 900 showing an example of the process shown in FIG. 8. Components are as shown in FIG. 7. Originating UE 902 can represent originating UE 702. Terminating UE 904 can represent terminating UE 704.

Originating UE 902 can perform measurement ("Msmt") at block 906 before sending the SIP INVITE, e.g., as described above with reference to block 802. As indicated by the dash-dot line, if the measurement corresponds to the service-interruption condition (block 804), the communication session can be initiated over the second access network, e.g., CS access network 110 (block 908). If not, call setup may proceed.

At any time throughout call setup, originating UE 902 may perform additional measurement(s) of the first access network, as indicated by block 910. As indicated by the dashed lines, if an additional measurement corresponds to a service-interruption condition, originating UE 902 may send signals causing the communication session to be cancelled (e.g., a NACK or a SIP CANCEL), and can then re-initiate the call at block 908.

Figure 10:
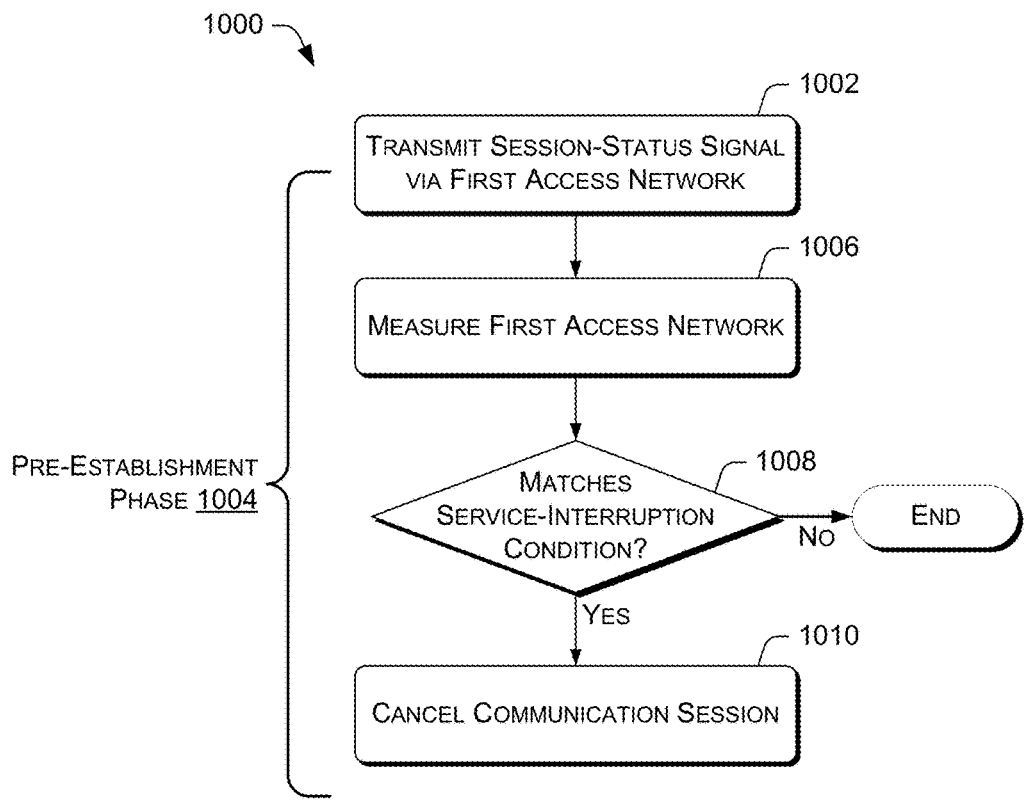
FIG. 10 illustrates an example process performed by, e.g., terminating user equipment for re-initiating a communication session during, e.g., the alerting or pre-alerting phases.

FIG. 10 illustrates an example process 1000 performed by user equipment for re-initiating a communication session during, e.g., the alerting or pre-alerting phases. In some examples, the user equipment is terminating user equipment of a communication session. In some examples, process 1000 may be performed in response to or subsequent to receipt of an initial invitation via a first access network of a first type. The initial invitation may include, e.g., a SIP INVITE request.

The process includes, at 1002, selectively transmitting a session-status signal via the first access network of the first type. The first access network can be, e.g., packet-switched access network 108. The session-status signal is transmitted during a pre-establishment phase 1004 of a communication session with another device. The session-status signal may be, e.g., a SIP 180 Ringing response or a SIP 183 Session in Progress response.

At 1006, during the pre-establishment phase 1004, the first access network is measured to provide a measurement. This can be done, e.g., as described above with reference to block 606. The measurement may include at least one of signal strength, packet loss, packet discard, or network congestion. In some examples, the measurement includes signal strength and the service-interruption condition includes a lower limit of the signal strength.

At 1008, it is determined whether the measurement corresponds to a service-interruption condition, e.g., signal strength below a threshold. If so, block 1008 can be followed by block 1010. If not, the method can end and normal communications may proceed.

At 1010, the communication session is cancelled. This can be done, e.g., by transmitting a NACK, a SIP 503 Service Unavailable response, or another SIP 5xx Server Failure response. Block 1010 is performed only after transmission of the session-status signal by block 1002. In some examples, e.g., illustrated below with respect to FIG. 13, block 1010 can include transmitting a SIP 503 response to the TAS. The TAS can then re-initiate the communication session over a different access network.

Figure 11:
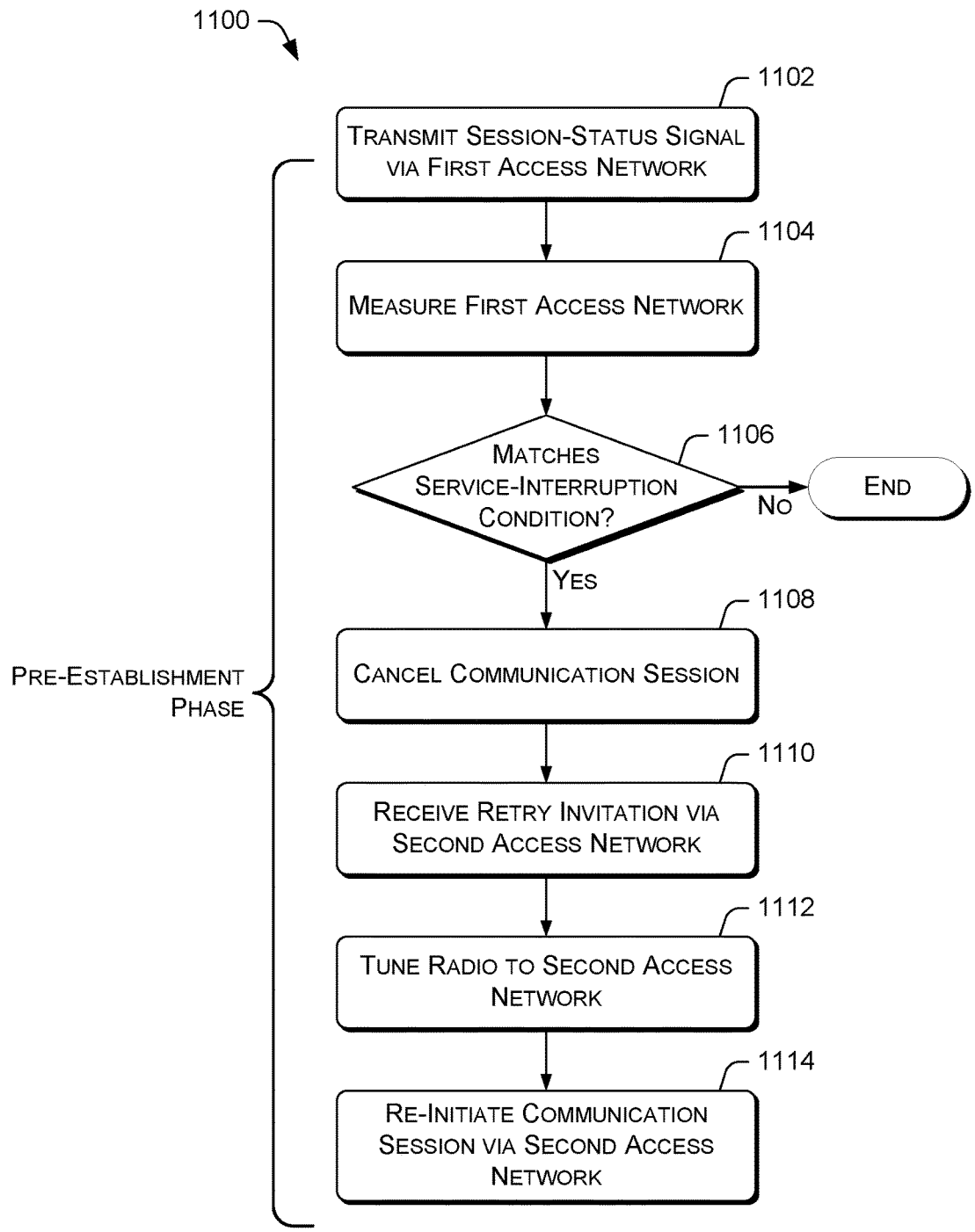
FIG. 11 illustrates an example process performed by, e.g., terminating user equipment for re-initiating of a communication session during, e.g., the alerting or pre-alerting phases.

FIG. 11 illustrates an example process 1100 performed by user equipment for re-initiating a communication session during, e.g., the alerting or pre-alerting phases. In some examples, the user equipment is terminating user equipment of a communication session. In some examples, process 1100 may be performed in response to or subsequent to receipt of an initial invitation via a first access network of a first type. The initial invitation may include, e.g., a SIP INVITE request.

Blocks 1102, 1104, 1106, and 1108 can correspond to blocks 1002, 1006, 1008, 1010 respectively. In at least one example, at 1108, a cancellation message is transmitted to a telephony application server (TAS) or other network device of the telecommunications network.

At 1110, a retry invitation to the communication session can be received. The invitation can be received via a second access network of a second, different type, e.g., a circuit-switched access network. In an example, the retry invitation can include a CS page.

At 1112, the radio is tuned to communicate with the second access network. This can be done, e.g., as described above with reference to block 612.

At 1114, in response to the received retry invitation, the communication session with the other device is re-initiated via the second access network.

Figure 12:
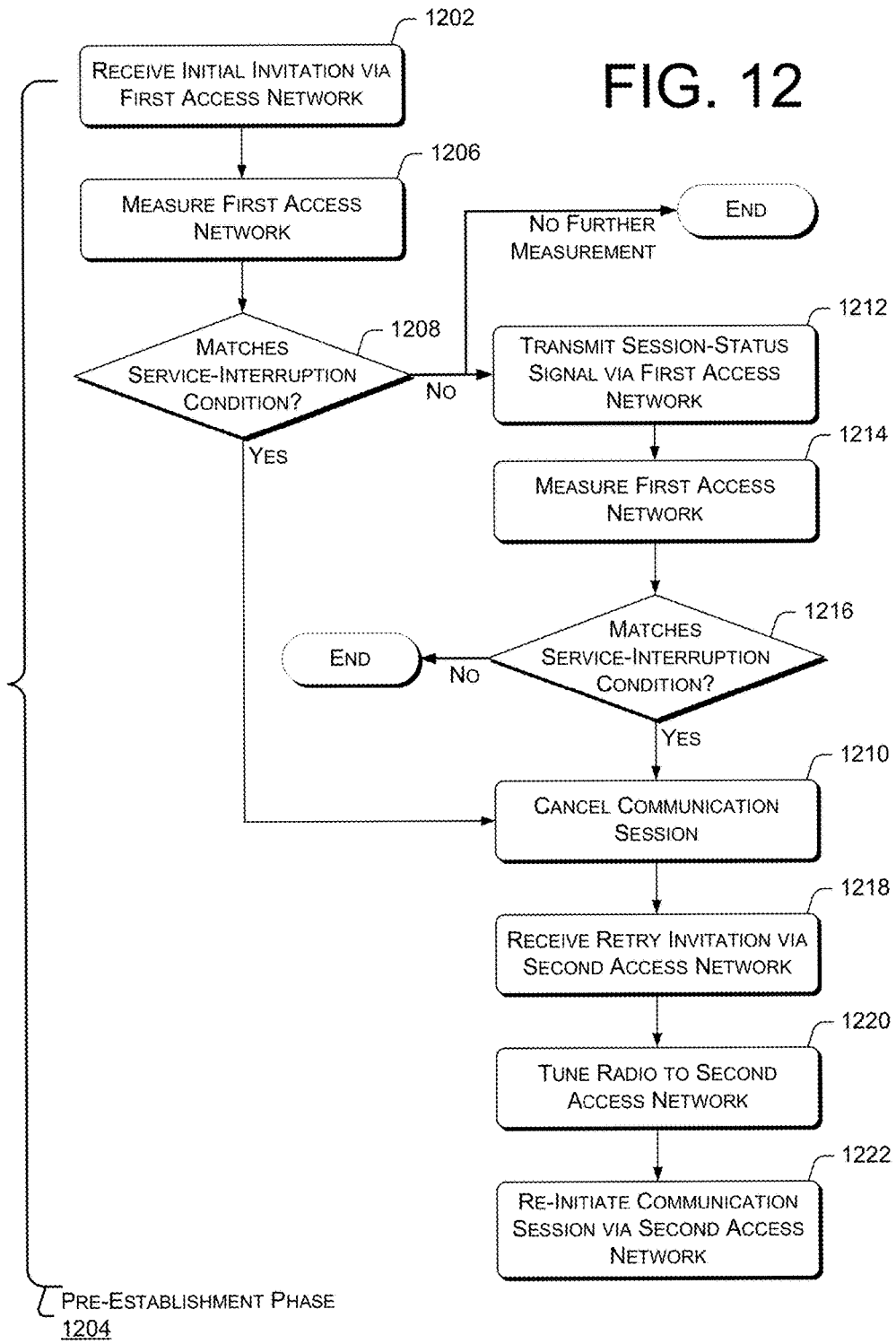
FIG. 12 illustrates an example process performed by, e.g., terminating user equipment for re-initiating a communication session during, e.g., the alerting or pre-alerting phases.
Figure 13:
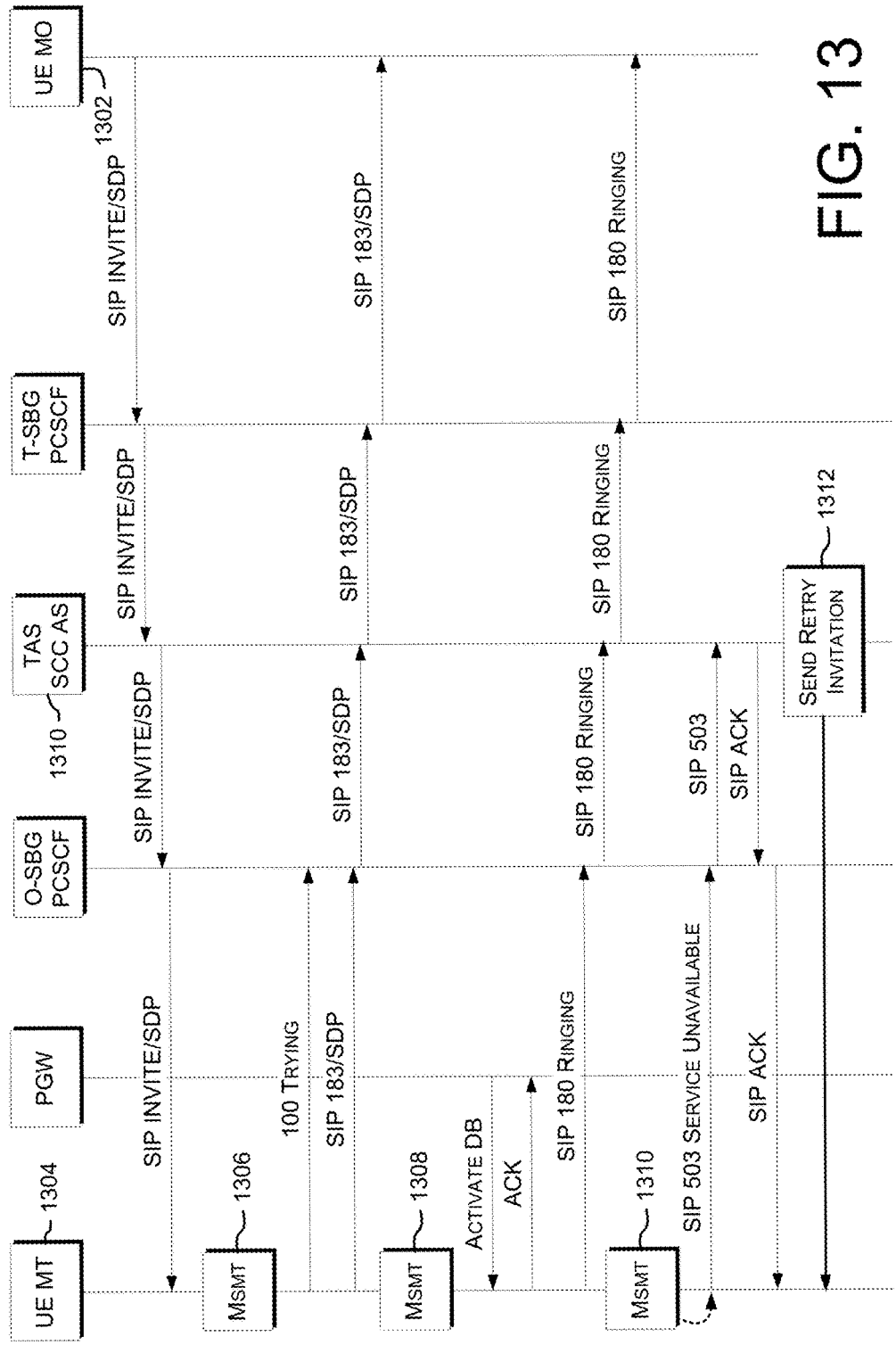
FIG. 13 is a call flow showing examples of processes shown in FIGS. 10, 11, and 12.

FIG. 12 illustrates an example process 1200 performed by user equipment for re-initiating a communication session during, e.g., the alerting or pre-alerting phases. In some examples, the user equipment is terminating user equipment of a communication session.

Process 1200 includes, at 1202, receiving an initial invitation to the communication session with the other device via the first access network of the first type. The pre-establishment phase 1204 follows or commences with the receipt of the initial invitation and precedes establishment of the communication session.

At 1206, responsive to the initial invitation (block 1202) and during the pre-establishment phase, the first access network is measured to provide a measurement. The measurement may include at least one of signal strength, packet loss, packet discard, or network congestion. The measurement can be measurement 1306, FIG. 13.

At 1208, in response to the measurement, it is determined whether the measurement corresponds to a service-interruption condition, e.g., too-low signal strength. If not, block 1212 is next. If so, block 1210 may be next, or the process may terminate if no further measurement is to be performed. Whether to perform a further measurement may be determined, e.g., by a preference setting or other data stored in the user equipment. In some examples, the measurement includes signal strength and the service-interruption condition includes a lower limit of the signal strength.

At 1210, the communication session is cancelled. In this way, if the measurement corresponds to a service-interruption condition, the transmitting 1212 and the measuring 1214, 1216 may be bypassed. Block 1210 may be followed by block 1218.

Blocks 1212, 1214, 1216 can correspond to blocks 1102, 1106, 1310, respectively. The service-interruption condition tested in block 1216 can be the same as that used in block 1208, or can be different.

In some examples, at 1218, a retry invitation to the communication session is received via a second access network of a second, different type. For example, the retry invitation can be a CS page received via CS access network 110.

At 1220, the radio is tuned to communicate with the second access network. This can be done, e.g., as described above with reference to block 612.

At 1222, in response to the received retry invitation, the communication session with the other device is re-initiated via the second access network.

FIG. 13 is a call flow 1300 showing examples of processes shown in FIGS. 10, 11, and 12. The originating UE 1302 ("UE MO") sends an SDP INVITE to terminating UE 1304 ("UE MT") via a first access network. Measurement 1306 can be performed after receipt of the SDP INVITE, e.g., as discussed below with reference to block 1206. Unless measurement 1306 triggers cancellation of the communications session, as discussed below, terminating UE 1304 responds with a session-status signal (block 1002). In this example, terminating UE 1304 transmits two successive session-status signals: a SIP 100 Trying response and a SIP 183 Session in Progress response carrying additional information about the session in the SDP format ("SIP 183/SDP").

At 1308, terminating UE 1304 measures the first access network (block 1006). In the example shown, the measurement does not correspond to a service-interruption condition. Accordingly, terminating UE 1304 accepts the activation of the dedicated bearer ("Activate DB"; "ACK"). Terminating UE 1304 then sends a SIP 180 Ringing session-status signal, transitioning the communication session from the pre-alerting phase to the alerting phase.

At 1310, terminating UE 1304 again measures the first access network. In the example shown, the measurement does correspond to a service-interruption condition. Accordingly, as indicated by the dashed line, terminating UE 1304 sends a SIP 503 Service Unavailable response ("SIP 503") to the TAS 1312 (e.g., via the P-CSCF). The TAS 1312 acknowledges the response ("SIP ACK"). TAS 1312 then re-initiates the communication session over a second access network, e.g., circuit-switched access network 110. At 1314, TAS 1312 sends a retry invitation, which is received by terminating UE 1304 (block 1110). Though not shown for the sake of brevity, terminating UE 1304 can then tune its radio (block 1112) and re-initiate the communication session (block 1114).

In this example, measurements are shown at 1306, 1308, and 1310. Terminating UE 1304 can perform any number ≥1 of measurements at any time during the pre-establishment phase.

Figure 14:
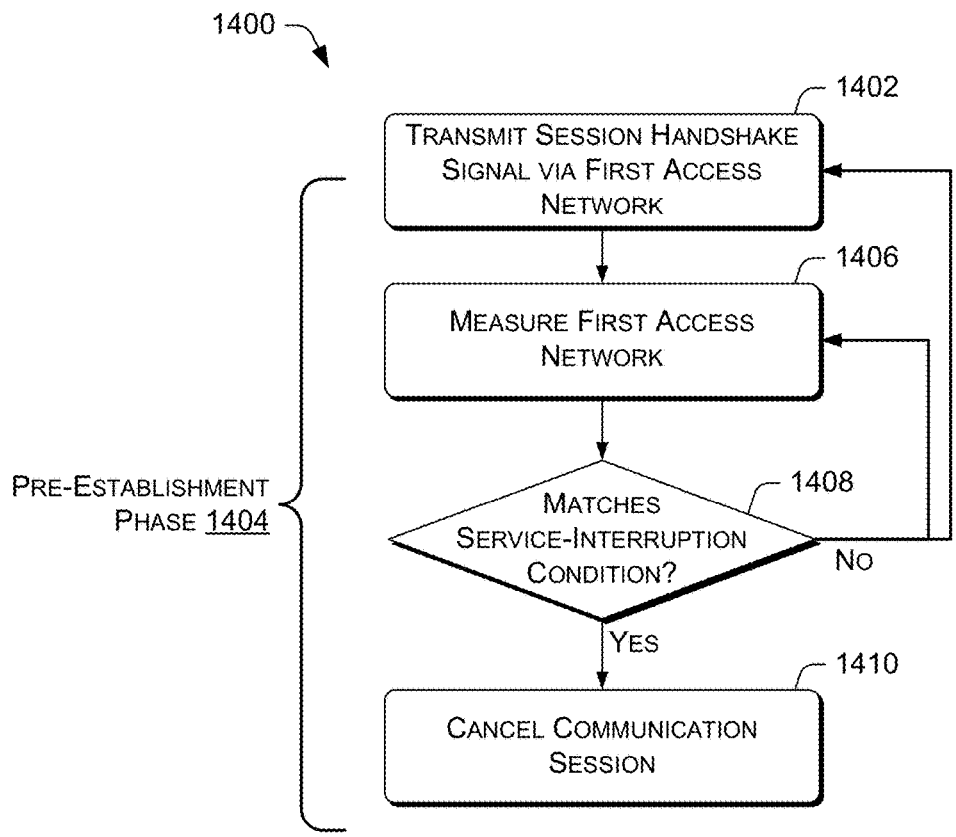
FIG. 14 illustrates an example process performed by user equipment for re-initiating a communication session during, e.g., the alerting or pre-alerting phases.

FIG. 14 illustrates an example process 1400 performed by user equipment for re-initating a communication session during, e.g., the alerting or pre-alerting phases. In some examples, the user equipment is user equipment of a communication session, e.g., originating or terminating user equipment.

Process 1400 includes, at 1402, during a pre-establishment phase 1404 of a communication session with another device, selectively transmitting a session-handshake signal via a first access network of a first type, e.g., a packet-switched type, using a radio of user equipment. The session-handshake signal can include, e.g., a SIP INVITE, a SIP 100 Trying response, a SIP 183 Session in Progress response, or another signal that initiates, maintains, or otherwise continues establishment of a communication session.

At 1406, during the pre-establishment phase, the first access network is measured. The measurement may include at least one of signal strength, packet loss, packet discard, or network congestion.

At 1408, it is determined whether the measurement corresponding to a service-interruption condition, e.g., low signal strength. If so, the next block is block 1410. In some examples, the measurement includes signal strength and the service-interruption condition includes a lower limit of the signal strength.

In some examples, blocks 1406, 1408 are performed one or more times to provide respective measurements. In these examples, if the measurement does not correspond to the service-interruption condition, the next block is block 1402 or block 1406.

At 1410, the communication session is cancelled. Block 1410 can be performed in response to the measurement (or at least one of the measurements) corresponding to the service-interruption condition. Block 1410 can include transmitting a SIP CANCEL, a NACK, a SIP 503 Service Unavailable response, or another signal indicating the communication session should be cancelled. Such signals may be transmitted after transmission of the session handshake signal. After block 1410, either the originating or the terminating user equipment, or a telecommunications network device, can re-initiate the call, e.g., via a different access network.

Figure 15:
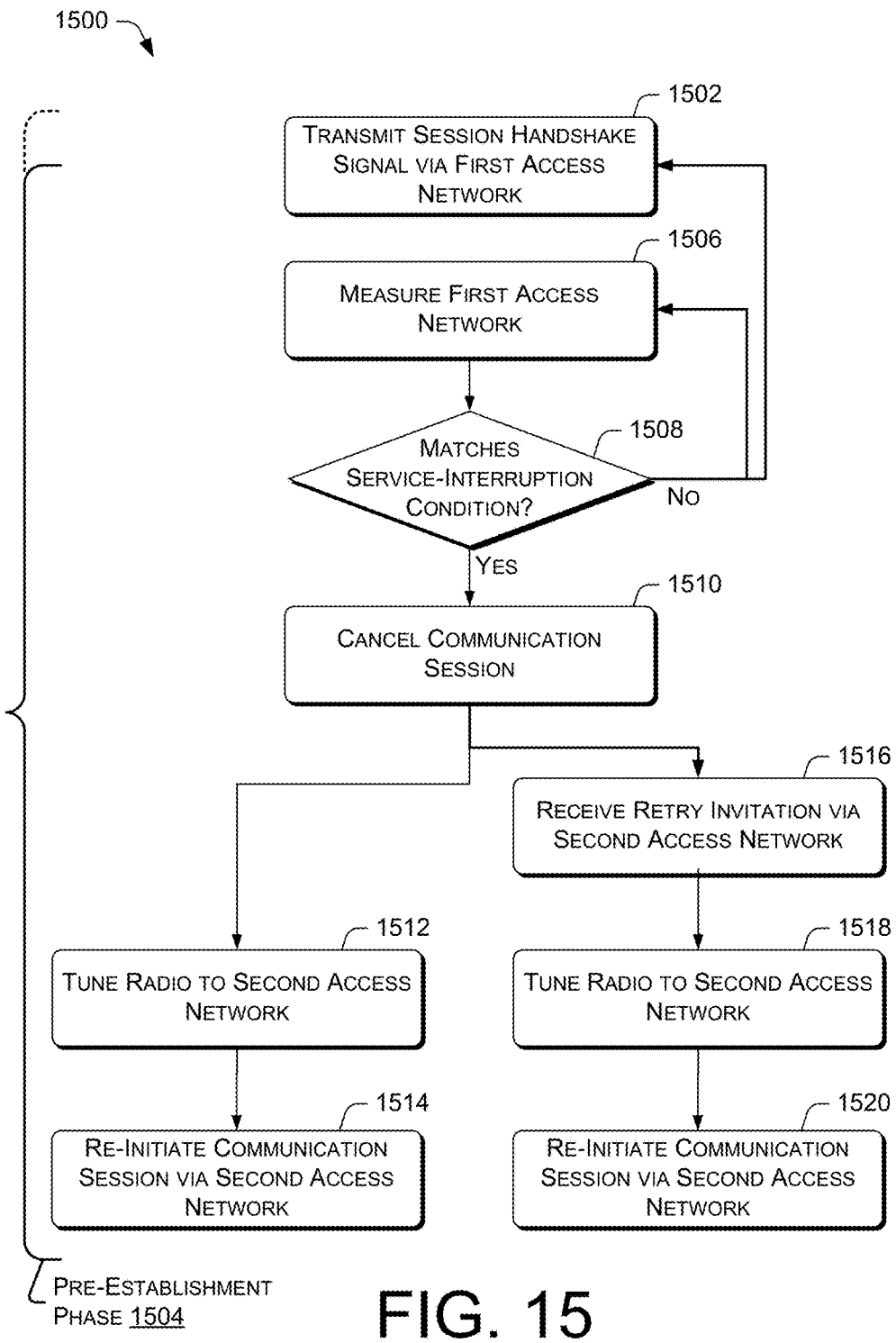
FIG. 15 illustrates an example process performed by user equipment for re-initiating a communication session during, e.g., the alerting or pre-alerting phases.

FIG. 15 illustrates an example process 1500 performed by user equipment, e.g., originating or terminating user equipment, for re-initating a communication session during, e.g., the alerting or pre-alerting phases. Block 1502, pre-establishment phase 1504, and blocks 1506, 1508, and 1510 can correspond to block 1402, pre-establishment phase 1404, and blocks 1406, 1408, and 1410, respectively. Block 1502 may be part of pre-establishment phase 1504 (as indicated by the dashed brace end) or may initiate establishment phase 1504 (as indicated by the solid brace end).

In some examples, the user equipment is originating user equipment, e.g., originating UE 702. After the canceling (block 1510), process 1500 may include, at 1512, tuning the radio to communicate with a second access network of a second, different type, e.g., a circuit-switched type.

At 1514, the communication session is re-initiated with the other device via the second access network. Block 1514 can include transmitting a SIP INVITE request, a SIP 180

Ringing response, a page over a circuit-switched access network, or another signal triggering the other device to resume or maintain communications with the user equipment.

In some examples, the user equipment is terminating user equipment, e.g., terminating UE 704. After the canceling (block 1510), Process 1500 may include, at 1516, receiving a retry invitation to the communication session via a second access network of a second, different type. In some examples, the first type may be a packet-switched network type and the second type may be a circuit-switched network type.

At 1518, the radio is tuned to communicate with the second access network. This can be done, e.g., as described above with reference to block 612.

At 1520, in response to the received retry invitation (block 1516), the communication session is re-initiated with the other device via the second access network. Block 1520 can include, e.g., acknowledging a received page over circuit-switched access network 110.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. User equipment (UE) comprising:
    a processor;
    a radio; and
    one or more components communicatively coupled to the radio and operated by the processor to perform operations comprising:
        selectively initiating a synchronous communication session between the UE and second user equipment via a first access network of a first type, wherein:
            a pre-establishment phase follows or commences with the initiation of the communication session and precedes establishment of the communication session; and
            the pre-establishment phase comprises at least one of a pre-alerting phase or an alerting phase;
        during the pre-establishment phase, selectively measuring the first access network to provide a first measurement;
        determining, during the pre-establishment phase, that the first measurement corresponds to a first service-interruption condition; and
        in response to the first measurement corresponding to the first service-interruption condition, during the pre-establishment phase:
            canceling the communication session by transmitting a cancellation message to a network device,
            tuning the radio to communicate with a second access network of a second type that is different from the first type, and
            re-initiating the communication session between the UE and the second user equipment via the second access network.

2. The user equipment of claim 1, wherein the first measurement includes at least one of packet discard or network congestion.

3. The user equipment of claim 1, wherein the first measurement includes signal strength and the first service-interruption condition includes a first lower limit of the signal strength.

4. The user equipment of claim 1, the operations further including:
    prior to the initiating, measuring the first access network to provide a second measurement; and
    in response to the second measurement corresponding to a second service-interruption condition,
        bypassing the initiating, the measuring the first measurement, and the canceling,
        tuning the radio to communicate with the second access network of the second type, and
        initiating the communication session between the UE and the second user equipment via the second access network.

5. The user equipment of claim 4, wherein the second measurement includes at least one of packet discard or network congestion.

6. User equipment (UE) comprising:
    a processor;
    a radio; and
    one or more components communicatively coupled to the radio and operated by the processor to perform operations comprising:
        during a pre-establishment phase of a communication session between the UE and second user equipment, transmitting a session-status signal via a first access network of a first type, wherein:
            the pre-establishment phase comprises at least one of a pre-alerting phase or an alerting phase; and
            the session-status signal comprises a Session Initiation Protocol (SIP) 1xx Provisional response;
        during the pre-establishment phase, selectively measuring the first access network to provide a first measurement;
        determining, during the pre-establishment phase, that the first measurement corresponds to a first service-interruption condition; and
        in response to the first measurement corresponding to the first service-interruption condition, during the pre-establishment phase, after transmission of the session-status signal, canceling the communication session by transmitting a cancellation message to a network device.

7. The user equipment of claim 6, the operations further including:
    receiving a retry invitation to the communication session via a second access network of a second type that is different from the first type;
    tuning the radio to communicate with the second access network, and
    in response to the received retry invitation, re-initiating the communication session between the UE and the second user equipment via the second access network.

8. The user equipment of claim 6, wherein the first measurement includes at least one of packet discard or network congestion.

9. The user equipment of claim 6, wherein the first measurement includes signal strength and the first service-interruption condition includes a first lower limit of the signal strength.

10. The user equipment of claim 6, the operations further including:
    receiving an initial invitation to the communication session between the UE and the second user equipment via the first access network of the first type, wherein the pre-establishment phase follows or commences with the receipt of the initial invitation and precedes establishment of the communication session;

responsive to the initial invitation and during the pre-establishment phase, measuring the first access network to provide a second measurement;

determining, during the pre-establishment phase, that the second measurement corresponds to a second service-interruption condition; and in response to the second measurement corresponding to the second service-interruption condition,
- bypassing the transmitting and the measuring the first measurement, and
- canceling the communication session by transmitting a second cancellation message.

11. The user equipment of claim 10, the operations further including:

receiving a retry invitation to the communication session via a second access network of a second type that is different from the first type, tuning the radio to communicate with the second access network, and in response to the received retry invitation, re-initiating the communication session between the UE and the second user equipment via the second access network.

12. The user equipment of claim 10, wherein the second measurement includes signal strength and the second service-interruption condition includes a second lower limit of the signal strength.

13. A method, comprising:

during a pre-establishment phase of a communication session between first user equipment and second user equipment, selectively transmitting a session-handshake signal via a first access network of a first type using a radio of the first user equipment, wherein the pre-establishment phase comprises at least one of a pre-alerting phase or an alerting phase;

during the pre-establishment phase, selectively measuring, by the first user equipment, the first access network one or more times to provide respective measurements;

determining, during the pre-establishment phase, that at least one of the measurements corresponds to a first service-interruption condition; and in response to at least one of the measurements corresponding to a first service-interruption condition, after transmission of the session-handshake signal, during the pre-establishment phase, transmitting a cancellation message associated with the communication session to a network device.

14. The method of claim 13, further including, after the canceling:

tuning the radio to communicate with a second access network of a second, different type, and re-initiating the communication session between the first user equipment and the second user equipment via the second access network.

15. The method of claim 13, the operations further including, after the canceling:

receiving, at the first user equipment, a retry invitation to the communication session via a second access network of a second, different type;

tuning the radio to communicate with the second access network, and in response to the received retry invitation, re-initiating the communication session between the first user equipment and the second user equipment via the second access network.

16. The method of claim 13, wherein each of the measurements includes at least one of packet discard or network congestion.

17. The method of claim 13, wherein a selected one of the measurements includes signal strength and the first service-interruption condition includes a first lower limit of the signal strength.

18. The user equipment of claim 1, wherein the cancellation message comprises at least a Negative Acknowledge (NACK) or a Session Initiation Protocol (SIP) CANCEL request.

19. The user equipment of claim 6, wherein the cancellation message comprises at least a Negative Acknowledge (NACK) or a SIP 5xx response.

20. The method of claim 13, further comprising:

selectively initiating a synchronous communication session between the first user equipment and the second user equipment by transmitting a SIP INVITE request via the first access network; and transmitting the cancellation message comprising at least a Negative Acknowledge (NACK) or a Session Initiation Protocol (SIP) CANCEL request, wherein the pre-establishment phase follows or commences with the initiation of the communication session and precedes establishment of the communication session.

* * * * *